(12) United States Patent
Kusanose et al.

(10) Patent No.: US 10,544,251 B2
(45) Date of Patent: Jan. 28, 2020

(54) TUBE USING HYDROGENATED BLOCK COPOLYMER

(71) Applicant: Asahi Kasei Kabushiki Kaisha, Tokyo (JP)

(72) Inventors: Yasuhiro Kusanose, Tokyo (JP); Hiroyuki Ichino, Tokyo (JP); Noriko Yagi, Tokyo (JP); Masahiro Fujiwara, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 22 days.

(21) Appl. No.: 15/758,370

(22) PCT Filed: Sep. 7, 2016

(86) PCT No.: PCT/JP2016/076336
§ 371 (c)(1),
(2) Date: Mar. 8, 2018

(87) PCT Pub. No.: WO2017/043542
PCT Pub. Date: Mar. 16, 2017

(65) Prior Publication Data
US 2018/0251589 A1    Sep. 6, 2018

(30) Foreign Application Priority Data

Sep. 9, 2015   (JP) ................... 2015-177933

(51) Int. Cl.
*C08F 297/04*   (2006.01)
*B32B 27/32*   (2006.01)
(Continued)

(52) U.S. Cl.
CPC .............. *C08F 297/04* (2013.01); *B32B 1/08* (2013.01); *B32B 27/08* (2013.01); *B32B 27/302* (2013.01);
(Continued)

(58) Field of Classification Search
CPC .......... C08F 297/04; C08F 8/04; B32B 27/00; B32B 27/32; B32B 1/08; B32B 27/08;
(Continued)

(56) References Cited

U.S. PATENT DOCUMENTS 4,985,499 A   1/1991   Nishikawa et al.
2002/0104544 A1   8/2002   Ogushi et al.
(Continued)

FOREIGN PATENT DOCUMENTS

EA   201492243 A1   5/2015
EP   2757131 A1   7/2014
(Continued)

OTHER PUBLICATIONS

International Search Report issued in corresponding International Patent Application No. PCT/JP2016/076336 dated Nov. 29, 2016.
(Continued)

*Primary Examiner* — Michael C Miggins
(74) *Attorney, Agent, or Firm* — Morgan, Lewis & Bockius LLP

(57) ABSTRACT

A tube including a hydrogenated block copolymer (a), wherein the hydrogenated block copolymer (a) includes, in a molecule, a polymer block mainly including a conjugated diene compound (C), a polymer block mainly including a conjugated diene compound (B), and a polymer block mainly including a vinyl aromatic compound (S).

26 Claims, 1 Drawing Sheet

(51) Int. Cl.
  *B32B 1/08* (2006.01)
  *B32B 27/08* (2006.01)
  *B32B 27/30* (2006.01)
  *C08L 23/14* (2006.01)
  *C08L 53/02* (2006.01)
  *F16L 11/04* (2006.01)

(52) U.S. Cl.
  CPC .............. *B32B 27/32* (2013.01); *C08L 23/14* (2013.01); *C08L 53/02* (2013.01); *F16L 11/04* (2013.01); *B32B 2270/00* (2013.01); *B32B 2597/00* (2013.01)

(58) Field of Classification Search
  CPC .............. B32B 27/302; B32B 2270/00; B32B 2597/00; C08L 15/00; C08L 53/025; C08L 23/14; C08L 53/02; F16L 11/04
  See application file for complete search history.

(56) References Cited

U.S. PATENT DOCUMENTS

| | | | |
|---|---|---|---|
| 2004/0167292 | A1 | 8/2004 | Willis |
| 2006/0178485 | A1 | 8/2006 | Shimakage et al. |
| 2011/0319837 | A1 | 12/2011 | Uehara et al. |
| 2015/0344684 | A1 | 12/2015 | Kusanose et al. |
| 2017/0137618 | A1 | 5/2017 | Horiuchi et al. |

FOREIGN PATENT DOCUMENTS

| | | |
|---|---|---|
| JP | H04-342752 A | 11/1992 |
| JP | H07-118335 A | 5/1995 |
| JP | H09-327893 A | 12/1997 |
| JP | H10-067894 A | 3/1998 |
| JP | H11-320765 A | 11/1999 |
| JP | 2000-093490 A | 4/2000 |
| JP | 2001-240636 A | 9/2001 |
| JP | 2002-248671 A | 9/2002 |
| JP | 2003-073433 A | 3/2003 |
| JP | 2003-205033 A | 7/2003 |
| JP | 2006-517984 A | 8/2006 |
| WO | 2004/081069 A1 | 9/2004 |
| WO | 2010/018743 A1 | 2/2010 |
| WO | 2010/104068 A1 | 9/2010 |
| WO | 2016/002764 A1 | 1/2016 |

OTHER PUBLICATIONS

Supplementary European Search Report issued in corresponding European Patent Application No. 16844403.2 dated Aug. 17, 2018.
International Preliminary Report on Patentability and Written Opinion issued in corresponding International Patent Application No. PCT/JP2016/076336 dated Mar. 22, 2018.

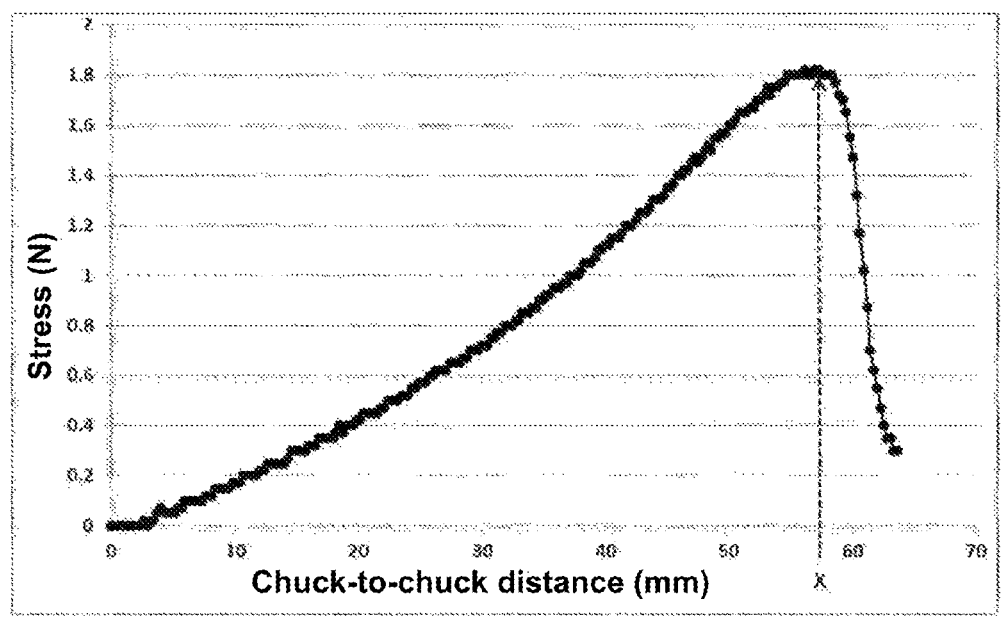

TUBE USING HYDROGENATED BLOCK COPOLYMER

TECHNICAL FIELD

The present invention relates to a tube using a hydrogenated block copolymer.

BACKGROUND ART

Hydrogenated block copolymers constituted by conjugated diene monomers and vinyl aromatic monomers, even if not vulcanized, have elasticity similar to that of vulcanized natural rubber and synthetic rubber, at ordinary temperature. Such hydrogenated block copolymers have excellent weatherability and heat resistance, and, at high temperatures, have processability similar to that of thermoplastic resins. Thus, the hydrogenated block copolymers are widely used, for example, in footwear, plastic modification, asphalt modification, viscous adhesive materials, household products, packaging materials for home appliances and industrial parts, toys, automotive parts, medical devices, and the like.

Meanwhile, polypropylene resin compositions, which generally have excellent chemical resistance and mechanical properties, are used in wide range of fields, for example, packaging materials, sundries, machine parts, automotive parts, and medical applications.

By necessity from the viewpoint of environmental issues, development of non-halogen transparent polymer materials has proceeded recently. Particularly in the field of medical tubes, polypropylene resins are used, and there arises a need for softening or transparentizing such resins depending on applications.

The following Patent Literature 1 discloses a tube including a styrene thermoplastic elastomer (a) and a polypropylene resin (b), wherein the elastomer (a) is a hydrogenated block copolymer including a polymer block containing an aromatic vinyl compound (A) and a polymer block containing isoprene and/or 1,3-butadiene (B), the content of polymer block (A) is 5 to 40% by mass before hydrogenation, the ratio of hydrogenation of the polymer block (B) is 70% or more, the content of 1,2-bonds and 3,4-bonds of the polymer block (B) is 30 to 85 mol %, the mass ratio of the styrene thermoplastic elastomer (a) to the polypropylene resin (b) [(a)/(b)] is 90/10 to 40/60, and the ratio of the diffraction peak intensity at a scattering angle of 14° [I(14)] to the diffraction peak intensity at a scattering angle of 15° in X-ray diffraction [I(15)] [I(14)/I(15)] is 1.4 or more.

The following Patent Literature 2 discloses a base material for transporting and preserving a medical solution, containing (A) a propylene polymer and (B) at least one thermoplastic elastomer selected from an ethylene elastomer (B1) and a hydrogenated styrene-diene elastomer (B2).

CITATION LIST

Patent Literature

Patent Literature 1: International Publication No. WO 2010/104068
Patent Literature 2: Japanese Patent Laid-Open No. 2003-205033

SUMMARY OF INVENTION

Technical Problem

Tubular molded articles used in the medical field such as infusion tubes are required to have properties such as transparency, flexibility, kink resistance, strain recoverability, and sticking resistance. Additionally, these properties are required to be well-balanced.

Both the tube disclosed in Patent Literature 1 and the base material for transporting and preserving a medical solution disclosed in Patent Literature 2, however, remain for the improvement in kink resistance, sticking resistance, and the balance of these properties.

Solution to Problem

In consideration of the problem involved in the conventional techniques described above, it is an object of the present invention to provide a tube including a hydrogenated block copolymer having a specific structure (a) and having excellent transparency, flexibility, kink resistance, strain recoverability, and sticking resistance.

That is, the present invention is as follows.

[1]
A tube comprising a hydrogenated block copolymer (a), wherein
the hydrogenated block copolymer (a) comprises, in a molecule, a polymer block mainly comprising a conjugated diene compound (C), a polymer block mainly comprising a conjugated diene compound (B), and a polymer block mainly comprising a vinyl aromatic compound (S),
a content of the polymer block mainly comprising the conjugated diene compound (C) is 1 to 30% by mass, a content of the polymer block mainly comprising the conjugated diene compound (B) is 69 to 98% by mass, and a content of the polymer block mainly comprising the vinyl aromatic compound (S) is 1 to 20% by mass in the hydrogenated block copolymer (a), and
the polymer block mainly comprising a conjugated diene compound (C) has a vinyl bond content before hydrogenation of 1 to 25 mol %, the polymer block mainly comprising the conjugated diene compound (B) has a vinyl bond content before hydrogenation of 60 to 100 mol %, and the hydrogenated block copolymer (a) has a ratio of hydrogenation of 80 mol % or more.

[2]
The tube according to [1], wherein a content of the polymer block (C) is 3 to 15% by mass, a content of the polymer block (B) is 72 to 94% by mass, and a content of the polymer block (S) is 3 to 13% by mass in the hydrogenated block copolymer (a), and the hydrogenated block copolymer (a) has a ratio of hydrogenation of 90 mol % or more.

[3]
The tube according to [1] or [2], wherein
the hydrogenated block copolymer (a) comprises two or more of the polymer blocks mainly comprising a conjugated diene compound (B) in a molecule, and
a content of a polymer block (B-1) present at a terminal of the hydrogenated block copolymer (a) of the polymer blocks mainly comprising the conjugated diene compound (B) is 1 to 10% by mass in the hydrogenated block copolymer (a).

[4]
A tube comprising a hydrogenated block copolymer (a), wherein
the hydrogenated block copolymer (a) comprises, in a molecule, a conjugated diene compound unit and a vinyl aromatic compound unit in a molecule,
a content of a vinyl aromatic compound unit in the hydrogenated block copolymer (a) is 1 to 20% by mass, the hydrogenated block copolymer (a) has a ratio of hydrogenation of 80 mol % or more, and has an amount of butylene and/or propylene of 50 to 95 mol % based on 100 mol % of the conjugated diene compound unit in total, the hydrogenated block copolymer (a) has a crystallization peak at −20 to 80° C. and a crystallization heat quantity of 0.1 to 10 J/g, and the hydrogenated block copolymer (a) has a Shore A hardness of 15 to 65.

[5]

The tube according to [4], wherein a content of the vinyl aromatic compound unit in the hydrogenated block copolymer (a) is 3 to 13% by mass, the hydrogenated block copolymer (a) has a ratio of hydrogenation of 90 mol %, and has an amount of butylene and/or propylene of 60 to 85 mol % based on 100 mol % of the conjugated diene compound unit in total, and the hydrogenated block copolymer (a) has a crystallization peak at 0 to 60° C. and a crystallization heat quantity of 1.0 to 8.0 J/g, and the hydrogenated block copolymer (a) has a Shore A hardness of 25 to 55.

[6]

The tube according to any one of [1] to [5], wherein a tan δ peak obtained by dynamic viscoelasticity measurement (1 Hz) of the hydrogenated block copolymer (a) is in a range of more than −45° C. and 10° C. or less, a value of the tan δ peak is 1.0 or more, and a half width of the tan δ peak is 20° C. or less.

[7]

The tube according to any one of [1] to [6], comprising the hydrogenated block copolymer (a) and a polypropylene resin.

[8]

The tube according to any one of [1] to [7], comprising at least an outer layer and an inner layer, wherein the outer layer comprises the polypropylene resin, and the inner layer comprises the hydrogenated block copolymer (a).

[9]

The tube according to [8], wherein the outer layer has a thickness of 5 to 1,000 μm, and the inner layer has a thickness of 10 to 3,000 μm.

[10]

The tube according to [8] or [9], wherein the outer layer comprises the hydrogenated block copolymer (a) and/or hydrogenated block copolymer (b1) (provided that the hydrogenated block copolymer (b1) comprises no polymer block mainly comprising a conjugated diene compound having a vinyl bond content before hydrogenation of 1 to 25 mol %), the hydrogenated block copolymer (b1) comprises a polymer block mainly comprising a conjugated diene compound (B1) and a polymer block mainly comprising a vinyl aromatic compound (S1), a content of the polymer block mainly comprising the conjugated diene compound (B1) is 75 to 92% by mass and a content of the polymer block mainly comprising the vinyl aromatic compound (S1) is 8 to 25% by mass in the hydrogenated block copolymer (b1), a vinyl bond content before hydrogenation of the polymer block mainly comprising a conjugated diene compound (B1) is 40 to 100 mol %, the hydrogenated block copolymer (b1) has a ratio of hydrogenation of 80 mol % or more, a content of the polypropylene resin in the outer layer is 60 to 100% by mass, and a content of the hydrogenated block copolymer (a) and/or hydrogenated block copolymer (b1) in the outer layer is 0 to 40% by mass.

[11]

The tube according to any one of [8] to [10], wherein the inner layer comprises a polypropylene resin, and a content of the hydrogenated block copolymer (a) in the inner layer is 40 to 95% by mass.

[12]

The tube according to any one of [8] to [11], wherein the inner layer comprises a hydrogenated block copolymer (b2) (provided that the hydrogenated block copolymer (b2) comprises no polymer block mainly comprising a conjugated diene compound having a vinyl bond content before hydrogenation of 1 to 25 mol %), the hydrogenated block copolymer (b2) comprises a polymer block mainly comprising a conjugated diene compound (B2) and a polymer block mainly comprising a vinyl aromatic compound (S2), a content of the polymer block mainly comprising the conjugated diene compound (B2) is 75 to 92% by mass and a content of the polymer block mainly comprising the vinyl aromatic compound (S2) is 8 to 25% by mass in the hydrogenated block copolymer (b2), a vinyl bond content before hydrogenation of the polymer block mainly comprising the conjugated diene compound (B2) is 60 to 100 mol %, the hydrogenated block copolymer (b2) has a ratio of hydrogenation of 80 mol % or more, a content of the polypropylene resin in the inner layer is 5 to 60% by mass, and a total content of the hydrogenated block copolymer (a) and the hydrogenated block copolymer (b2) in the inner layer is 40 to 95% by mass.

[13]

The tube according to any one of [8] to [12], comprising an intermediate layer between the outer layer and the inner layer, wherein the intermediate layer comprises the hydrogenated block copolymer (a).

[14]

The tube according to [13], wherein the intermediate layer has a thickness of 10 to 3,000 μm.

[15]

The tube according to any one of [1] to [14], wherein the hydrogenated block copolymer (a) has a melt flow rate of 0.5 to 10 g/10 min.

[16]

The tube according to any one of claims 1 to 15, wherein an intensity ratio of a diffraction peak intensity at a scattering angle (2θ) of 15° (I(15)) to a diffraction peak intensity at a scattering angle (2θ) of 14° (I(14)), (I(14)/I(15)), in wide angle X-ray diffraction measurement is 0.1 or more and less than 1.4.

[17]

The tube according to any one of [1] to [16], wherein the hydrogenated block copolymer (a) has a weight average molecular weight (Mw) of 100,000 to 300,000, and a ratio of a weight average molecular weight (Mw) to a number average molecule weight (Mn) of the hydrogenated block copolymer (a), (Mw)/(Mn), is 1.01 to 1.30.

[18]

The tube according to any one of [1] to [17], wherein an integrated amount of elution at −20° C. or less measured by cross-fractionation chromatography (CFC) is 0.1% or more and less than 40% based on a total volume, an integrated amount of elution in a range of more than −20° C. and less than 60° C. is 40% or more and less than 95% based on a total volume, and an integrated amount of elution in a range of 60° C. or more and 150° C. or less is 5% or more and less than 60% based on a total volume.

[19]

The tube according to any one of [1] to [18], wherein a molecular weight distribution (Mw/Mn) of an eluted component in a range of 10° C. or more and less than 60° C. measured by cross-fractionation chromatography (CFC) is 1.05 or more and 1.50 or less.

Advantageous Effects of Invention

According to the present invention, there can be provided a tube having excellent transparency, flexibility, kink resistance, strain recoverability (recovery of tube clogging), and sticking resistance.

BRIEF DESCRIPTION OF DRAWING

FIG. 1 is an exemplary stress curve obtained from the relation between stress and chuck-to-chuck distance on measurement of the stress during tube bending by a tensile compression tester.

DESCRIPTION OF EMBODIMENTS

Embodiments for carrying out the present invention (hereinbelow, simply referred to as "the present embodiment") will be mentioned below in detail. The following embodiments are provided for illustrating the present invention and are not intended to limit the present invention to the contents below. The present invention can be properly modified and implemented without departing from the gist.

[Tube]

The tube of the present embodiment contains a hydrogenated block copolymer (a).

Tubes as used herein refer to those having a hollow tubular structure, including both those having a single-layered structure and those having a multi-layered structure of two or more layers, when viewed in the cross section.

First Embodiment

A tube according to a first embodiment
contains a hydrogenated block copolymer (a), wherein
the hydrogenated block copolymer (a) comprises, in a molecule,
a polymer block mainly comprising a conjugated diene compound (C),
a polymer block mainly comprising a conjugated diene compound (B), and
a polymer block mainly comprising a vinyl aromatic compound (S),
the content of the polymer block mainly comprising a conjugated diene compound (C) is 1 to 30% by mass, the content of the polymer block mainly comprising a conjugated diene compound (B) is 69 to 98% by mass, and the content of the polymer block mainly comprising a vinyl aromatic compound (S) is 1 to 20% by mass in the hydrogenated block copolymer (a), and
the polymer block mainly comprising a conjugated diene compound (C) has a vinyl bond content before hydrogenation of 1 to 25 mol %, the polymer block mainly comprising a conjugated diene compound (B) has a vinyl bond content before hydrogenation of 60 to 100 mol %, and the hydrogenated block copolymer (a) has a ratio of hydrogenation of 80 mol % or more.

Second Embodiment

A tube according to a second embodiment
contains a hydrogenated block copolymer (a), wherein
the hydrogenated block copolymer (a) comprises, in a molecule,
a conjugated diene compound unit and a vinyl aromatic compound unit,
the content of the vinyl aromatic compound unit in the hydrogenated block copolymer (a) is 1 to 20% by mass,
the hydrogenated block copolymer (a) has a ratio of hydrogenation of 80 mol % or more, and has an amount of butylene and/or amount of propylene of 50 to 95 mol % based on 100 mol % of the conjugated diene compound unit in total,
the hydrogenated block copolymer (a) has a crystallization peak at −20 to 80° C. and a crystallization heat quantity of 0.1 to 10 J/g, and
the hydrogenated block copolymer (a) has a Shore A hardness of 15 to 65.

The hydrogenated block copolymer (a) contained in the tube of the first embodiment described above may have the structure of the hydrogenated block copolymer (a) contained in the second embodiment described above, and the tube of the first embodiment may have the properties of the tube of the second embodiment.

(Hydrogenated Block Copolymer (a))

The hydrogenated block copolymer (a) contained in the tube of the first embodiment, in a molecule, comprises
a polymer block mainly comprising a conjugated diene compound (C),
a polymer block mainly comprising a conjugated diene compound (B), and
a polymer block mainly comprising a vinyl aromatic compound (S).

The hydrogenated block copolymer (a) contained in the tubes of the first embodiment and the second embodiment contains a conjugated diene compound unit and a vinyl aromatic compound unit.

The content of the polymer block mainly comprising a conjugated diene compound (C) is 1 to 30% by mass, the content of the polymer block mainly comprising a conjugated diene compound (B) is 69 to 98% by mass, and the content of the polymer block mainly comprising a vinyl aromatic compound (S) is 1 to 20% by mass in the hydrogenated block copolymer (a) in the tube of the present embodiment.

The polymer block mainly comprising a conjugated diene compound (C) before hydrogenation has a vinyl bond content of 1 to 25 mol %, the polymer block mainly comprising a conjugated diene compound (B) before hydrogenation has a vinyl bond content of 60 to 100 mol %, and the hydrogenated block copolymer (a) has a ratio of hydrogenation of 80 mol % or more.

The content of the polymer blocks (C), (B), and (S) can be measured by the method described in examples mentioned below.

Herein, "mainly comprising" in the present embodiment means that 60% by mass or more of an intended monomer unit is contained in an intended polymer block.

From the viewpoint of the transparency, flexibility, and kink resistance of tube of the present embodiment, the content of the conjugated diene compound in the polymer block mainly comprising a conjugated diene compound (C) and the content of the conjugated diene compound in the polymer block mainly comprising a conjugated diene compound (B) are, each independently, preferably 70% by mass or more, more preferably 80% by mass or more, still more preferably 90% by mass or more.

From the viewpoint of sticking resistance, the content of the vinyl aromatic compound in the polymer block mainly comprising a vinyl aromatic compound (S) is preferably 70% by mass or more, more preferably 80% by mass or more, still more preferably 90% by mass or more.

The "vinyl bond content before hydrogenation" in the polymer blocks mainly comprising a conjugated diene polymer (C) or (B) means the proportion of the conjugated diene before hydrogenation incorporated in the bonding forms of 1,2-bond and 3,4-bond to that in bonding forms of 1,2-bond, 3,4-bond, and 1,4-bond.

The vinyl bond content can be measured by nuclear magnetic resonance spectral analysis (NMR).

In the first embodiment, the content of the polymer block mainly comprising a conjugated diene compound (C) in the hydrogenated block copolymer (a) is 1 to 30% by mass.

The content of the polymer block mainly comprising a conjugated diene compound (C) in the hydrogenated block copolymer (a) is preferably 3 to 20% by mass, more preferably 3 to 15% by mass, still more preferably 5 to 13% by mass, from the viewpoint of achieving the kink resistance and the sticking resistance of the tube simultaneously.

The content of the polymer block (C) in the hydrogenated block copolymer (a) can be controlled to within the above range by means of the amount of the conjugated diene compound, for example the amount of butadiene, to be polymerized in a first step, as described in examples mentioned below.

In the first embodiment, the vinyl bond content before hydrogenation of the polymer block mainly comprising a conjugated diene compound (C) is 1 to 25 mol %.

The vinyl bond content before hydrogenation of the polymer block mainly comprising a conjugated diene compound (C) is preferably 3 to 22 mol %, more preferably 5 to 20 mol %, from the viewpoint of the kink resistance, strain recoverability, and sticking resistance of the tube.

The vinyl bond content before hydrogenation of the polymer block mainly comprising a conjugated diene compound (C) can be measured by the method described in examples mentioned below.

The vinyl bond content can be controlled by use of a vinylating agent such as polar compounds, Lewis bases, ethers, and amines.

In the first embodiment, the content of the polymer block mainly comprising a conjugated diene compound (B) in the hydrogenated block copolymer (a) is 69 to 98% by mass.

The content of the polymer block (B) is preferably 70 to 96% by mass, more preferably 72 to 94% by mass, particularly preferably 80 to 90% by mass, from the viewpoint of the transparency, flexibility, and kink resistance of tube of the present embodiment.

The content of the polymer block (B) in the hydrogenated block copolymer can be controlled to within the above range by means of the amount of the conjugated diene compound, for example the amount of butadiene, to be polymerized in a second step, as described in examples mentioned below.

In the first embodiment, the vinyl bond content before hydrogenation of the polymer block mainly comprising a conjugated diene compound (B) is 60 to 100 mol %.

The vinyl bond content before hydrogenation of the polymer block mainly comprising a conjugated diene compound (B) is preferably 68 to 95 mol %, more preferably 73 to 90 mol %, from the viewpoint of the transparency, flexibility, kink resistance, and sticking resistance of the tube.

The vinyl bond content before hydrogenation of the polymer block mainly comprising a conjugated diene compound (B) can be measured by the method described in examples mentioned below.

The vinyl bond content can be controlled by use of a vinylating agent such as polar compounds, Lewis bases, ethers, and amines.

The conjugated diene compound used in the polymer blocks (C) and (B) in the hydrogenated block copolymer (a) in the tube of the first embodiment and the conjugated diene compound used in the conjugated diene compound unit in the tube of the second embodiment are diolefins having a pair of conjugated double bonds.

Examples of the diolefin include, but not limited to, 1,3-butadiene, 2-methyl-1,3-butadiene (isoprene), 2,3-dimethyl-1,3-butadiene, 1,3-pentadiene, 2-methyl-1,3-pentadiene, 1,3-hexadiene, and farnesene.

Particularly common examples of diolefin include 1,3-butadiene and isoprene. One of these may be used singly, or two or more of these may be used in combination.

Examples of the vinyl aromatic compound used in the polymer block (S) in the hydrogenated block copolymer in the tube of the first embodiment and the vinyl aromatic compound used for the vinyl aromatic compound unit in the hydrogenated block copolymer in the tube of the second embodiment include, but not limited to, vinyl aromatic compounds such as styrene, α-methylstyrene, p-methylstyrene, divinylbenzene, 1,1-diphenylethylene, N,N-dimethyl-p-aminoethyl styrene, and N,N-diethyl-p-aminoethyl styrene. Of these, styrene, α-methylstyrene, and 4-methylstyrene are preferably used from the viewpoint of availability and productivity. Styrene is particularly preferred. The polymer block (S) may be constituted by one type of vinyl aromatic compound unit or may be constituted by two or more types of these units.

Incidentally, the conjugated diene compound and the vinyl aromatic compound described above can also be applied to the aforementioned hydrogenated block copolymer (b1) and hydrogenated block copolymer (b2).

In the first embodiment, the content of the polymer block mainly comprising a vinyl aromatic compound (S) in the hydrogenated block copolymer (a) is 1 to 20% by mass.

The content of the polymer block mainly comprising a vinyl aromatic compound (S) is preferably 2 to 15% by mass, more preferably 3 to 13% by mass, still more preferably 4 to 8% by mass, from the viewpoint of achieving the kink resistance and sticking resistance of the tube simultaneously.

In the second embodiment, the content of the vinyl aromatic compound unit in the hydrogenated block copolymer (a) is 1 to 20% by mass.

The content of the entire vinyl aromatic compound units is preferably 2 to 13% by mass, more preferably 3 to 13% by mass, particularly preferably 3 to 8% by mass from the viewpoint of transparency, flexibility, kink resistance, strain recoverability, and sticking resistance of the tube.

The content of the vinyl aromatic compound monomer unit in the hydrogenated block copolymer (a) can be controlled to within the above range by means of the amount of the aromatic vinyl compound, for example, the amount of styrene, to be polymerized in a third step, as described in examples mentioned below.

The content of the vinyl aromatic compound unit in the hydrogenated block copolymer (a) can be measured by proton nuclear magnetic resonance spectrometry ($^1$H-NMR) Specifically, the content can be measured by the method described in examples mentioned below.

In the present embodiment, the ratio of hydrogenation of the hydrogenated block copolymer (a), that is, the ratio of hydrogenation of total conjugated diene compound units contained in the hydrogenated block copolymer (a) is 80 mol % or more.

The ratio of hydrogenation is preferably 85 mol % or more, more preferably 90 mol % or more from the viewpoint of microdispersibility into a polypropylene resin.

The ratio of hydrogenation of the total unsaturated group units contained in the conjugated diene monomer unit of the hydrogenated block copolymer (a) can be measured by nuclear magnetic resonance spectrometry analysis (NMR), and specifically, can be measured by the method described in examples mentioned below.

Allowing the ratio of hydrogenation of the hydrogenated block copolymer (a) to be 80 mol % or more increases the crystallization of the polymer block (C) and makes the smoothness, sticking resistance, kink resistance, and strain recoverability of tube of the present embodiment satisfactory. When a resin composition prepared by mixing the hydrogenated block copolymer (a) with a polypropylene resin is used as a material for the tube, the solubility parameter of the polymer block (B) becomes close to the solubility parameter of the polypropylene resin, and the dispersibility of the hydrogenated block copolymer (a) becomes satisfactory. Thus, a resin composition molded product to be obtained will have satisfactory flexibility, transparency, and kink resistance.

The ratio of hydrogenation can be controlled by, for example, the amount of the catalyst on hydrogenation. The hydrogenation rate can be controlled by, for example, the amount of the catalyst, amount of hydrogen fed, pressure, and temperature on hydrogenation.

In the second embodiment, the amount of butylene and/or amount of propylene is 50 to 95 mol % based on 100 mol % of the conjugated diene compound unit in total.

An amount of butylene and/or amount of propylene of 50 mol % or more can provide effects of the transparency, flexibility, and kink resistance of the tube, and an amount of 95 mol % or less can provide effects of strain recoverability and sticking resistance.

Also, the amount of butylene and/or amount of propylene is preferably 57 to 87 mol %, more preferably 60 to 85 mol %, particularly preferably 60 to 85 mol %.

The butylene and propylene compounds can be obtained by hydrogenating a diolefin having a pair of conjugated double bonds, and examples of particularly common diolefins include 1,3-butadiene and isoprene. One of these may be used singly, or two or more of these may be used in combination.

The amount of butylene and/or amount of propylene can be controlled by use of a vinylating agent such as polar compounds, Lewis bases, ethers, and amines and by means of the ratio of hydrogenation.

Based on 100 mol % of the polymer block mainly comprising a conjugated diene (C) and the polymer block mainly comprising a conjugated diene compound (B) in total, the total amount of butylene and/or total amount of propylene of the polymer block mainly comprising a conjugated diene compound (C) and the polymer block mainly comprising a conjugated diene compound (B) can be measured by a method described in examples mentioned below.

In the second embodiment, the hydrogenated block copolymer (a) has a crystallization peak at −20 to 80° C. and a crystallization heat quantity of 0.1 to 10 J/g.

When the hydrogenated block copolymer (a) has a crystallization peak of −20 to 80° C. and a crystallization heat quantity of 0.1 to 10 J/g, there can be provided an effect of enhancing the transparency, flexibility, kink resistance, strain recoverability, and sticking resistance of the tube.

The temperature range including the crystallization peak is preferably −10 to 70° C., more preferably 0 to 60° C.

The crystallization heat quantity is preferably 0.5 to 9.0 J/g, more preferably 1.0 to 8.0 J/g, still more preferably 2.0 to 5.0 J/g.

The crystallization peak temperature range and crystallization heat quantity of the hydrogenated block copolymer (a) can be controlled by allowing the block copolymer (a) to contain a polymer block mainly comprising a conjugated diene compound (C) having a vinyl bond content before hydrogenation of 1 to 25 mol %, adjusting the content of the polymer block, additionally using a vinylating agent which is a Lewis base typified by polar compounds, Lewis bases, ether compounds, and amine compounds, or adjusting the ratio of hydrogenation.

The temperature range including the crystallization peak and the crystallization heat quantity can be measured by the method described in examples mentioned below.

The crystallization peak temperature range and the crystallization heat quantity of the hydrogenated block copolymer (a), if fall within the range described in the production method mentioned below, satisfy the requirement. As the content of the polymer block (C) increases, the crystallization peak temperature range and the crystallization heat quantity tend to increase. As the amount of the vinylating agent increases on polymerization of the polymer block (C), the crystallization peak temperature range and the crystallization heat quantity tend to be lower. When the ratio of hydrogenation becomes lower, the crystallization peak temperature range and the crystallization heat quantity tend to be lower.

In the second embodiment, the hydrogenated block copolymer (a) has a Shore A hardness preferably in the range of 15 to 65. With a Shore A hardness of 15 to 65, there can be provided an effect of enhancing the flexibility, kink resistance, and strain recoverability of the tube.

The Shore A hardness ranges preferably from 25 to 55, more preferably from 30 to 50.

The Shore A hardness of the hydrogenated block copolymer (a) can be controlled by, for example, the content of the polymer blocks mainly comprising a conjugated diene compound (C), (B), and (A), use of a vinylating agent which is a Lewis base typified by polar compounds, ether compounds, and amine compounds, and the ratio of hydrogenation. As the total content of the polymer block (C) and the polymer block (A) increases, the Shore A hardness tends to increase. As the amount of the vinylating agent increases, the Shore A hardness tends to decrease. When the ratio of hydrogenation decreases, the Shore A hardness tends to decrease.

The Shore A hardness can be measured by the method described in examples mentioned below.

In a preferable aspect of the tube of the present embodiment, the tan δ peak obtained by dynamic viscoelasticity measurement (1 Hz) of the hydrogenated block copolymer (a) is in the range of more than −45° C. and 10° C. or less.

When the tan δ peak obtained by dynamic viscoelasticity measurement (1 Hz) of the hydrogenated block copolymer (a) is in the range of more than −45° C. and 10° C. or less, the value of the tan δ peak is 1.0 or more, and the half width of the tan δ peak is 20° C. or less, there can be provided an effect of enhancing the flexibility, kink resistance, and strain recoverability of the tube of the present embodiment.

The tan δ peak obtained by dynamic viscoelasticity measurement (1 Hz) of the hydrogenated block copolymer (a) is preferably in the range of −40° C. to 0° C., more preferably in the range of −35° C. to −5° C. The value of the tan δ peak is preferably 1.5 or more, more preferably 1.8 or more. The half width of the tan δ peak is preferably 18° C. or less, more preferably 16° C. or less.

The tan δ peak is controlled by the amount to be used of a vinylating agent such as polar compounds, Lewis bases, ethers, and amines and, if falls within the range described in the production method mentioned below, satisfies the requirement. For example, when the amount of the vinylating agent on polymerization of the polymer block (B) described in Example 1 mentioned below is reduced, the tan δ peak temperature tends to decrease. The tan δ peak can be also controlled by the ratio of hydrogenation, and when ratio of hydrogenation decreases, the tan δ peak temperature tends to decrease.

With respect to control of the tan δ peak value and half width, the requirement is satisfied if the values are in the range described in the production method mentioned below. For example, with a larger amount of the vinylating agent on polymerization of the polymer block (B), the tan δ peak value tends to increase and the half width tends to be narrower, and the molecular weight distribution becomes wider. Adjustment of the content and polymerization temperature of the polymer block (B) in addition to the control can control the values within the above ranges. As the content of the polymer block (B) increases, the tan δ peak value tends to increase and the half width tends to be narrower. When polymerization of the polymer block (B) is carried out at an isothermal temperature (the temperature difference is small), the tan δ peak value tends to increase and the half width tends to be smaller.

The tan δ peak obtained by dynamic viscoelasticity measurement (1 Hz) of the hydrogenated block copolymer (a) can be measured by the method described in examples mentioned below.

Examples of the hydrogenated block copolymer (a) include those having a structure represented by any one of the following general formulas:

(C-B)$_n$-S

(C-B-S)$_n$

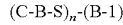(C-B-S)$_n$-(B-1)

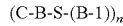(C-B-S-(B-1))$_n$

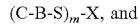(C-B-S)$_m$-X, and

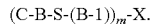(C-B-S-(B-1))$_m$-X.

In the above general formulas, (C) is the polymer block (C), and when a plurality of the blocks is present, the blocks may be different or the same, (S) is the polymer block (S), and when a plurality of the blocks is present, the blocks may be different or the same, and (B) is the polymer block (B), and when a plurality of the blocks is present, the blocks may be different or the same.

(B-1) is a type of the polymer block (B).

n is 1 or more, preferably an integer of 1 to 3.

m represents 2 or more, and is preferably an integer of 2 to 6.

X represents a coupling agent residue or a multifunctional initiator residue.

The hydrogenated block copolymer (a) is preferably a polymer represented particularly by the structural formula C-B-S or C-B-S-(B-1).

In the present embodiment, the hydrogenated block copolymer (a) has a melt flow rate (MFR; in compliance with ISO 1133) of preferably 0.5 to 10 g/10 min, more preferably 1 to 8 g/10 min or less, still more preferably 1.5 to 6 g/10 min or less, from the viewpoint of the processability, flexibility, transparency, sticking resistance, kink resistance, strain recoverability, and the like of the tube.

The melt flow rate can be controlled by adjusting the molecular weight of the hydrogenated block copolymer (a), the content of the vinyl aromatic monomer unit, the vinyl bond content of the conjugated diene moiety, the ratio of hydrogenation, the block structure of the hydrogenated block copolymer (a), and the like.

The melt flow rate can be measured by the method described in examples mentioned below.

Particularly, in the tube of the present embodiment, allowing the melt flow rate of the hydrogenated block copolymer (a) to be in the range of 1.5 to 6 g/10 min can provide a significant effect of enhancing the sticking resistance in combination with satisfactory kink resistance in addition to the processability of the tube.

The structures of the hydrogenated block copolymer (a), the hydrogenated block copolymer (b1), and the hydrogenated block copolymer (b2) mentioned below are not particularly limited, may take any form of, for example, linear, branched, radial, and comb-like forms, and can be made to be a suitable structure depending on the desired physical properties or the like.

From the viewpoint of the performance to be imparted to the tube of the present embodiment, that is, transparency and flexibility, in the case where the hydrogenated block copolymer (a) contains two or more of the polymer blocks mainly comprising a conjugated diene compound (B) in a molecule, the content of the polymer block (B-1) present at a terminal of the hydrogenated block copolymer (a) of the polymer blocks mainly comprising a conjugated diene compound (B) is preferably 1 to 10% by mass in the hydrogenated block copolymer (a).

The content of the polymer block (B-1) present at a terminal of the hydrogenated block copolymer (a) can be controlled by means of the feed composition of polymerization monomers.

The content of the polymer block (B-1) present at a terminal of the hydrogenated block copolymer (a) is preferably 1.5 to 7% by mass, more preferably 2 to 5% by mass in the hydrogenated block copolymer (a).

In the present embodiment, the weight average molecular weight of the hydrogenated block copolymer (a) (Mw) (hereinafter, the weight is also referred to as "Mw") is preferably 100,000 to 300,000 from the viewpoint of processability.

The weight average molecular weight (Mw) is more preferably 130,000 to 270,000, still more preferably 150,000 to 250,000 from the viewpoint of the processability, kink resistance, strain recoverability, and sticking resistance of the tube of the present embodiment.

The weight average molecular weight of the hydrogenated block copolymer (a) (Mw) is a weight average molecular weight (Mw) obtained by determining the molecular weight at the peak of the chromatogram obtained by the measurement by GPC based on the calibration curve determined from the measurement of commercially available standard polystyrenes (made using the molecular weight at a peak standard polystyrenes). Specifically, the content can be measured by the method described in examples mentioned below.

The ratio of the weight average molecular weight (Mw) to the number average molecule weight (Mn) of the hydrogenated block copolymer (a), (Mw)/(Mn), is preferably 1.01 to 1.30, from the viewpoint of homogeneous dispersibility into PP.

(Mw)/(Mn) is more preferably 1.02 to 1.28, still more preferably 1.03 to 1.25, from the viewpoint of dispersion homogeneity into a polypropylene resin (PP).

The weight average molecular weight (Mw) and (Mw)/(Mn) can be controlled to the above numerical range by appropriately setting the polymerization time, amount of a polar substance to be added, and polymerization temperature.

(Method for Producing Hydrogenated Block Copolymer (a))

The hydrogenated block copolymer (a) can be produced, generally, by polymerizing predetermined monomers in an organic solvent with an organic alkali metal compound as the polymerization initiator followed by conducting hydrogenation.

The polymerization form may be either batch polymerization or continuous polymerization, or may be a combination thereof.

From the viewpoint of obtaining a block copolymer having a narrow molecular weight distribution and high intensity, a batch polymerization method is preferred.

The polymerization temperature is generally 0 to 150° C., preferably 20 to 120° C., more preferably 40 to 100° C. Within this temperature range, the polymerization may be either isothermal polymerization or adiabatic polymerization.

From the viewpoint of the tan δ peak value and the half width of the tan δ peak of the hydrogenated block copolymer (a) to be obtained, the polymerization temperature distribution of the polymer block (B) is preferably 0° C. or more and 30° C. or less, more preferably 0° C. or more and 25° C. or less, still more preferably 0° C. or more and 20° C. or less.

The polymerization time, which depends on the intended polymer, is usually within 24 hours, preferably 0.1 to 10 hours. From the viewpoint of obtaining a block copolymer having a narrow molecular weight distribution and high intensity, the polymerization time is more preferably 0.5 to 3 hours.

The atmosphere of the polymerization system is not particularly limited and is only required to be in a range of pressure sufficient to maintain nitrogen and a solvent in the liquid phase.

It is preferred that impurities, such as water, oxygen, and carbon dioxide, which inactivate the polymerization initiator and living polymer be not present in the polymerization system.

Examples of the organic solvent include, but not limited to, aliphatic hydrocarbons such as n-butane, isobutane, n-pentane, n-hexane, n-heptane, and n-octane; alicyclic hydrocarbons such as cyclohexane, cycloheptane, and methylcyclopentane; and aromatic hydrocarbons such as benzene, xylene, toluene, and ethylbenzene.

As the organic alkali metal compound which is the polymerization initiator, organic lithium compounds are preferred. As the organic lithium compound, an organic monolithium compound, organic dilithium compound, or organic polylithium compound is used. Examples of the organic lithium compound include, but not limited to, ethyllithium, n-propyllithium, isopropyllithium, n-butyllithium, sec-butyllithium, t-butyllithium, phenyllithium, hexamethylenedilithium, butadienyllithium, and isopropenyldilithium.

Of these, in terms of polymerization activity, n-butyllithium and sec-butyllithium are preferred.

The amount of the organic alkali metal compound which is the polymerization initiator to be used, depending on the molecular weight of the intended block copolymer, is generally preferably in the range of 0.01 to 0.5 phm (parts by mass per 100 parts by mass of the monomer), more preferably in the range of 0.03 to 0.3 phm, still more preferably in the range of 0.05 to 0.15 phm.

The vinyl bond content of the polymer block (B) and polymer block (C) contained in the hydrogenated block copolymer (a) can be adjusted by using a Lewis base, for example, a compound such as ether and amine as the vinylating agent. The amount of the vinylating agent to be used can be adjusted by means of the intended vinyl bond content.

Alternatively, dividedly adding the vinylating agent and a metal alkoxide mentioned below under two or more conditions enables polymer blocks each having a different vinyl bond content to be produced in a polymer block mainly comprising a conjugated diene compound.

Examples of the vinylating agent include, but not limited to, ether compounds, ether-based compounds having two or more oxygen atoms, and tertiary amine compounds.

Examples of the tertiary amine compound include, but not limited to, pyridine, N,N,N',N'-tetramethylethylenediamine, tributylamine, tetramethylpropanediamine, 1,2-dipiperidinoethane, and bis[2-(N,N-dimethylamino)ethyl]ether.

One of these may be used singly, or two or more of these may be used in combination.

As the tertiary amine compound, compounds having two amine units are preferred. Further, of these, those having a structure that exhibits symmetry in the molecule are more preferred. N,N,N',N'-tetramethylethylenediamine, bis[2-(N,N-dimethylamino)ethyl]ether, and 1,2-dipiperidinoethane are more preferred.

In the present embodiment, copolymerization of a hydrogenated block copolymer may be carried out under coexistence of the aforementioned vinylating agent, an organic lithium compound, and an alkali metal alkoxide. The alkali metal alkoxide herein is a compound represented by the general formula MOR, wherein, M is an alkali metal, and R is an alkyl group.

As the alkali metal of the alkali metal alkoxide, from the viewpoint of a high vinyl bond content, a narrow molecular weight distribution, a high polymerization rate, and a high block ratio, sodium or potassium is preferred.

Examples of the alkali metal alkoxide include, but not limited to, preferably sodium alkoxides, lithium alkoxides, and potassium alkoxides having an alkyl group having 2 to 12 carbon atoms, more preferably sodium alkoxides and potassium alkoxides having an alkyl group having 3 to 6 carbon atoms, still more preferably sodium-t-butoxide, sodium-t-pentoxide, potassium-t-butoxide, and potassium-t-pentoxide.

Of these, even more preferred are sodium-t-butoxide and sodium-t-pentoxide, which are sodium alkoxides.

In the polymerization step of the hydrogenated block copolymer of the present embodiment, in the case where polymerization is carried out under coexistence of a vinylating agent, an organic lithium compound, and an alkali metal alkoxide, the molar ratio of the vinylating agent to the organic lithium compound (vinylating agent/organic lithium compound) and the molar ratio of the alkali metal alkoxide to the organic lithium compound (alkali metal alkoxide/organic lithium compound) are preferably allowed to coexist in the following molar ratios.

Vinylating agent/organic lithium compound: 0.2 to 3.0
Alkali metal alkoxide/organic lithium compound: 0.01 to 0.3

The molar ratio of the vinylating agent/organic lithium compound is preferably 0.2 or more, from the viewpoint of a high vinyl bond content and a high polymerization rate, and less than 3.0, from the viewpoint of obtaining a narrow molecular weight distribution and high hydrogenation activity. The molar ratio of the alkali metal alkoxide/organic lithium compound is 0.01 or more, from the viewpoint of a high vinyl bond content, a high polymerization rate, and a high block ratio, and 0.3 or less, from the viewpoint of obtaining a narrow molecular weight distribution and high hydrogenation activity.

Accordingly, the polymerization rate is increased, the vinyl bond content of the intended hydrogenated block copolymer can be increased as well as its molecular weight distribution can be narrowed, and furthermore, the block ratio tends to increase. As a result, the performance to be imparted to the polypropylene resin composition, that is, low anisotropy, flexibility, transparency, smoothness, sticking resistance, kink resistance, and strain recoverability tend to be more satisfactory.

The molar ratio of the vinylating agent/organic lithium compound in the polymerization step is preferably 0.8 or more, from the viewpoint of a high vinyl bond content and a high polymerization rate, preferably 2.5 or less from the viewpoint of a narrow molecular weight distribution and high hydrogenation activity, more preferably 1.0 or more and 2.0 or less.

The molar ratio of the alkali metal alkoxide/organic lithium compound is preferably 0.02 or more from the viewpoint of a high vinyl bond content, a high polymerization rate, and a high block ratio, preferably 0.2 or less, from the viewpoint of a narrow molecular weight distribution and high hydrogenation activity, more preferably 0.03 or more and 0.1 or less, still more preferably 0.03 or more and 0.08 or less.

Further, the molar ratio of the alkali metal alkoxide/vinylating agent is preferably 0.010 or more, from the viewpoint of a high vinyl bond content, a high polymerization rate, and a high block ratio, preferably 0.100 or less from the viewpoint of achieving a narrow molecular weight distribution and obtaining high hydrogenation activity, more preferably 0.012 or more and 0.080 or less, still more preferably 0.015 or more and 0.06 or less, even more preferably 0.015 or more and 0.05 or less.

An example of a method for producing blocks each having a different vinyl bond content in the polymer block mainly comprising a conjugated diene compound include a method including use of a deactivator for the vinylating agent.

Examples of the deactivator include alkylmetal compounds, and the deactivator is selected from alkylaluminum, alkylzinc, and alkylmagnesium having 1 to 20 carbon atoms per alkyl substituent, and mixtures thereof.

The method of hydrogenation on producing the hydrogenated block copolymer (a) is not particularly limited. For example, by providing the block copolymer obtained above with hydrogen in the presence of a hydrogenation catalyst to thereby hydrogenate the copolymer, there can be obtained a hydrogenated block copolymer in which double-bond residues of the conjugated diene compound unit are hydrogenated.

The ratio of hydrogenation can be controlled by means of, for example, the amount of the catalyst on hydrogenation. The hydrogenation rate can be controlled by means of, for example, the amount of the catalyst, amount of hydrogen fed, pressure, and temperature on hydrogenation.

Pellets of the hydrogenated block copolymer (a) can be produced by pelletizing the hydrogenated block copolymer (a).

Examples of a pelletizing method include a method including extruding the hydrogenated block copolymer into a strand form from a single screw or twin screw extruder and cutting the extruded product in water with a rotary blade installed at the front face of a die portion; a method including extruding the hydrogenated block copolymer in a strand form from a single screw or twin screw extruder and cutting the extruded product with a strand cutter after water cooling or air cooling; and a method including shaping the hydrogenated block copolymer into a sheet form with a roll after melt blending with an open roll or a Banbury mixer, further, cutting the sheet into a strip form, and thereafter cutting the strip-formed sheet into a cuboidal pellet with a pelletizer.

Incidentally, the size and shape of a pellet molded product of the hydrogenated block copolymer are not particularly limited.

An antiblocking agent for pellets can be blended in pellets of the hydrogenated block copolymer, as required, for the purpose of preventing blocking of pellets.

Examples of the antiblocking agent for pellets include, but not limited to, calcium stearate, magnesium stearate, zinc stearate, polyethylene, polypropylene, ethylene bis stearylamide, talc, and amorphous silica.

Calcium stearate, polyethylene, and polypropylene are preferred from the viewpoint of the transparency of the tube of the present embodiment.

A preferable amount thereof is 500 to 6,000 ppm with respect to the hydrogenated block copolymer (a). A more preferable amount is 1,000 to 5,000 ppm with respect to the hydrogenated block copolymer (a). The antiblocking agent for pellets is preferably blended in a state in which the agent is stuck to the surface of pellets, and a certain amount of the agent can be included inside the pellets.

The tube of the present embodiment preferably contains the aforementioned hydrogenated block copolymer (a) and a polypropylene resin.

The content of the hydrogenated block copolymer (a) is preferably 5 to 100% by mass, more preferably 30 to 95% by mass, still more preferably 50 to 90% by mass.

The content of the polypropylene resin is preferably 0 to 95% by mass, more preferably 5 to 70% by mass, still more preferably 10 to 50% by mass.

With the contents in the above ranges, there can be provided effects of the transparency, flexibility, kink resistance, strain recoverability, and sticking resistance.

(Configuration of Tube)

The tube of the present embodiment preferably has at least an outer layer and an inner layer in its cross section.

Additionally, it is preferred that the outer layer contains a polypropylene resin and the inner layer contains the aforementioned hydrogenated block copolymer (a).

Having the above configuration, a tube can be provided having excellent flexibility, transparency, kink resistance, and strain recoverability.

The tube of the present embodiment preferably has a thickness of the outer layer of 5 to 1,000 μm and a thickness of the inner layer of 10 to 3,000 μm, from the viewpoint of the flexibility, transparency, kink resistance, and strain recoverability.

The thickness of the outer layer of the tube of the present embodiment is more preferably 10 to 500 μm, still more preferably 20 to 200 μm.

The thickness of the inner layer of the tube of the present embodiment is more preferably 20 to 2,000 μm, still more preferably 30 to 1,000 μm.

(Polypropylene Resin)

Examples of the polypropylene resin include random polypropylene resins, homopolypropylene resins, and block polypropylene resins.

The polypropylene resin is preferably a random polypropylene resin.

Here, "random" in random polypropylene refers to a copolymer of propylene with monomers other than propylene in which the monomers other than propylene are randomly incorporated in a propylene chain and substantially do not link each other.

The random polypropylene is not particularly limited provided that the content of the propylene unit is less than 98% by mass. Preferable examples of the random polypropylene include random copolymers of propylene and ethylene or random copolymers of propylene and an α-olefin having 4 to 20 carbon atoms.

When, as random polypropylene, a random copolymer of propylene and ethylene or a random copolymer of propylene and an α-olefin having 4 to 20 carbon atoms is used, flexibility, transparency, impact resistance, and kink resistance tends to be more satisfactory.

Example of the α-olefin include, but not limited to, ethylene, 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene, and 1-eicosene. α-olefins having 2 to 8 carbon atoms are preferred, and examples thereof include ethylene, 1-butene, 3-methyl-1-butene, 1-hexene, and 4-methyl-1-pentene.

One of these α-olefins can be used singly, or two or more of these can be used in combination. One of random polypropylenes also can be used singly or two or more of these can be used in combination.

Of random polypropylenes, from the viewpoint of the flexibility, transparency, impact resistance, and kink resistance of the tube of the present embodiment, it is more preferred to use at least one selected from the group consisting of propylene-ethylene random copolymers, propylene-1-butene random copolymers, and propylene-ethylene-1-butene random terpolymers.

From the viewpoint of the flexibility, transparency, low stickiness, impact resistance, and kink resistance, the random polypropylene is a random copolymer of propylene and ethylene or a random copolymer of propylene and an α-olefin having 4 to 12 carbon atoms. The content of the ethylene or α-olefin unit in the random polypropylene is preferably more than 2% by mass and less than 40% by mass, and the content of the propylene units is preferably 60% by mass or more and less than 98% by mass.

From the similar viewpoint similar to the above, the content of the ethylene or α-olefin unit is more preferably more than 2% by mass and less than 30% by mass, still more preferably 2.5% by mass or more and less than 25% by mass, even more preferably 3% by mass or more and less than 20% by mass. The content of the propylene unit is more preferably 70% by mass or more and less than 98% by mass, still more preferably 75% by mass or more and less than 97.5% by mass, even more preferably 80% by mass or more and less than 97% by mass.

The content of the propylene unit, the content of the ethylene unit, and the content of the α-olefin unit in the random polypropylene can be determined by the carbon nuclear magnetic resonance ($^{13}$C-NMR) method.

The melt flow rate of the random polypropylene (MFR; 230° C., in compliance with ISO 1133) is preferably 1 to 30 g/10 min, more preferably 1 to 25 g/10 min, still more preferably 2 to 20 g/10 min, even more preferably 3 to 15 g/10 min, from the viewpoint of the processability and low stickiness of a random polypropylene composition to be obtained.

The catalyst used on producing the random polypropylene is not particularly limited, and preferred is a polymerization method in which a stereoregular catalyst is employed, for example. Examples of the stereoregular catalyst include, but not limited to, Ziegler catalysts and metallocene catalysts. Of these catalysts, metallocene catalysts are preferred from the viewpoint of the sticking resistance and kink resistance of the tube of the present embodiment.

The molecular weight distribution of the random polypropylene (Mw/Mn) is preferably 3.5 or less, from the viewpoint of the sticking resistance and kink resistance of the tube of the present embodiment.

Mw/Mn is preferably 3.0 or less, still more preferably 2.8 or less.

The lower limit is not particularly limited and preferably 1.5 or more. Especially, it is preferred that the random polypropylene be one polymerized with a metallocene-based catalyst and have a molecular weight distribution (Mw/Mn) of 1.5 or more and 3.5 or less. The molecular weight distribution of the random polypropylene can be determined by the ratio of the weight average molecular weight (Mw) to the number average molecular weight (Mn) obtained by GPC measurement.

The inner layer and the outer layer of the tube of the present embodiment may contain other additives depending on the required performance.

Examples of the additives include, but not limited to, a fire retardant, a stabilizer, a colorant, a pigment, an antioxidant, an antistatic agent, a disperser, a flow enhancing agent, a mold-releasing agent such as metallic stearate, silicone oil, a mineral oil-based softener, a synthetic resin-based softener, a copper inhibitor, a cross-linker, and a nucleating agent.

The resin composition constituting the tube of the present embodiment preferably contains at least one glidant selected from fatty acid amide-based glidants and fatty acid monoglyceride-based glidants in order to prevent tube surfaces or insides from fixing to each other.

One of the fatty acid amide-based glidant and fatty acid monoglyceride-based glidant each may be used singly, or two or more of these may be used in combination.

Examples of the fatty acid amide-based glidant include, but not limited to, erucic acid amide, behenic acid amide, oleic acid amide, stearic acid amide, N-stearyllauric acid amide, N-stearylstearic amide, N-stearylbehenic acid amide, N-stearylerucic acid amide, N-oleyloleic acid amide, N-oleylbehenic acid amide, N-laurylerucic acid amide, ethylenebisoleic acid amide, ethylenebisstearic acid amide, hexamethylenebisoleic acid amide, and hexamethylenebiserucic acid amide. Of these, erucic acid amide, behenic acid amide, oleic acid amide, stearic acid amide, and ethylenebisstearic acid amide are preferred, and oleic acid amide is more preferred.

Examples of the fatty acid monoglyceride-based glidant include, but not limited to, lauric acid monoglyceride, myristic acid monoglyceride, palmitic acid monoglyceride, stearic acid monoglyceride, oleic acid monoglyceride, and behenic acid monoglyceride. Of these, stearic acid monoglyceride is preferred.

The content of the glidant in the resin composition constituting the tube of the present embodiment is preferably 0.05% by mass or more from the viewpoint of preventing fixing, and is preferably 0.5% by mass or less, more preferably 0.2% by mass or less, from the viewpoint of preventing the glidant from bleeding out from inside the tube to thereby compromise the printability onto the tube surface. From these viewpoints, the content of the glidant in the resin composition constituting the tube of the present embodiment is in the range of preferably 0.05 to 0.5% by mass, more preferably 0.05 to 0.2% by mass.

(Specific Configurations of Inner Layer and Outer Layer)
<First Configuration>

In the tube of the present embodiment, it is preferred that the outer layer comprise the hydrogenated block copolymer (a) and/or hydrogenated block copolymer (b1) (provided that the hydrogenated block copolymer (b1) comprises no polymer block mainly comprising a conjugated diene compound having a vinyl bond content before hydrogenation of 1 to 25 mol %), that the hydrogenated block copolymer (b1) comprise a polymer block mainly comprising a conjugated diene compound (B1) and a polymer block mainly comprising a vinyl aromatic compound (S1), that the content of the polymer block mainly comprising a conjugated diene compound (B1) be 75 to 92% by mass and the content of the polymer block mainly comprising a vinyl aromatic compound (S1) be 8 to 25% by mass in the hydrogenated block copolymer (b1), that the vinyl bond content before hydrogenation of the polymer block mainly comprising a conjugated diene compound (B1) be 40 to 100 mol %, that the ratio of hydrogenation of the hydrogenated block copolymer (b1) be 80 mol % or more, that the content of the polypropylene resin in the outer layer be 60 to 100% by mass, and that the content of the hydrogenated block copolymer (a) and/or hydrogenated block copolymer (b1) of the outer layer be 0 to 40% by mass.

Having the above configuration, a tube can be provided having excellent transparency, flexibility, and sticking resistance.

Incidentally, in the hydrogenated block copolymer (b1), the definition of "mainly comprising", materials such as the conjugated diene compound and vinyl aromatic compound, vinyl bond content, and ratio of hydrogenation can be defined and controlled in the same manner as for the aforementioned hydrogenated block copolymer (a).

<Second Configuration>

In the tube of the present embodiment, it is preferred that the inner layer comprise the hydrogenated block copolymer (a) and a polypropylene resin, and that the content of the hydrogenated block copolymer (a) in the inner layer be 40 to 95% by mass.

Having the above configuration, a tube can be provided having excellent flexibility, and sticking resistance.

When the inner layer of the tube contains the hydrogenated block copolymer (a) and the polypropylene resin, the content of the hydrogenated block copolymer (a) in the inner layer is more preferably 50 to 90% by mass, still more preferably 60 to 85% by mass.

<Third Configuration>

In the tube of the present embodiment, it is preferred that the inner layer comprise the hydrogenated block copolymer (b2) (provided that the hydrogenated block copolymer (b2) comprises no polymer block mainly comprising a conjugated diene compound having a vinyl bond content before hydrogenation of 1 to 25 mol %), that the hydrogenated block copolymer (b2) comprise a polymer block mainly comprising a conjugated diene compound (B2) and a polymer block mainly comprising a vinyl aromatic compound (S2), that the content of the polymer block mainly comprising a conjugated diene compound (B2) be 75 to 92% by mass and the content of the polymer block mainly comprising a vinyl aromatic compound (S2) be 8 to 25% by mass in the hydrogenated block copolymer (b2), that the vinyl bond content before hydrogenation of the polymer block mainly comprising a conjugated diene compound (B2) be 40 to 100 mol %, and that the ratio of hydrogenation of the hydrogenated block copolymer (b2) be 80 mol % or more, that the content of the polypropylene resin in the inner layer be 5 to 60% by mass, and that the total content of the hydrogenated block copolymer (a) and the hydrogenated block copolymer (b2) in the inner layer be 40 to 95% by mass.

Having the above configuration, a tube can be provided having excellent sticking resistance.

Incidentally, in the hydrogenated block copolymer (b2), the definition of "mainly comprising", materials such as the conjugated diene compound and vinyl aromatic compound, the vinyl bond content, and the ratio of hydrogenation can be defined and controlled in the same manner as for the aforementioned hydrogenated block copolymer (a).

(Method for Producing Hydrogenated Block Copolymer (b1) and Hydrogenated Block Copolymer (b2))

The hydrogenated block copolymer (b1) and the hydrogenated block copolymer (b2) can be produced in the same manner as for the aforementioned hydrogenated block copolymer (a).

(Exemplary Structures of Hydrogenated Block Copolymer (b1))

Examples of the aforementioned hydrogenated block copolymer (b1) include those having a structure represented by any one of the following general formulas:

$(S1-B1)_n$, $S1-(B1-S1)_n$, $B1-(S1-B1)_n$, $[(B1-S1)_n]_m-Z$, $[(S1-B1)_n]_m-Z$, $[(B1-S1)_n-B1]_m-Z$, and $[(S1-B1)_n-S1]_m-Z$.

In the above general formulas, S1 is a polymer block mainly comprising a vinyl aromatic compound monomer unit (S1), and B1 is a polymer block mainly comprising a conjugated diene compound monomer unit (B1).

The boundary between the polymer block (S1) and the polymer block (B1) need not necessarily be clear.

n is an integer of 1 or more, preferably an integer of 1 to 5.

m is an integer of 2 or more, preferably 2 to 11, more preferably 2 to 8.

Z represents a coupling agent residue. The coupling agent residue herein means a residue of a coupling agent after being used to bond a plurality of copolymers comprising conjugated diene compound monomer units and vinyl aromatic hydrocarbon compound monomer units between a polymer block (S1) and a polymer block (S1), between a polymer block (B1) and a polymer block (B1), or between a polymer block (S1) and a polymer block (B1).

Examples of the coupling agent include bifunctional coupling agents and multifunctional coupling agents. Examples of the bifunctional group coupling agent include, but not limited to, dihalogen compounds such as dimethyldichlorosilane and dimethyldibromosilane; and acid esters such as methyl benzoate, ethyl benzoate, phenyl benzoate, and phthalates.

Examples of the multifunctional coupling agent having three or more functional groups include, but not limited to, trihydric or more polyalcohols, epoxidized soybean oil, polyvalent epoxy compounds such as diglycidyl bisphenol A; halogenated silicon compounds represented by the formula $R1_{(4-n)}SiX_n$ (wherein, R1 is a hydrocarbon group having 1 to 20 carbon atoms, X is a halogen, and n is an integer of 3 or 4), and halogenated tin compounds.

Examples of the halogenated silicon compound includes, but not limited to, methylsilyl trichloride, t-butylsilyl trichloride, silicon tetrachloride, and brominated products thereof.

Examples of the halogenated tin compound include, but not limited to, polyvalent halogenated compounds such as methyl tin trichloride, t-butyl tin trichloride, and tin tetrachloride. Dimethyl carbonate, diethyl carbonate, and the like also can be used.

In the above general formulas, vinyl aromatic compound monomer units in the polymer block (S1) and the polymer block (B1) may be homogeneously distributed or may be taperingly distributed. Alternatively, when the polymer block (S1) and the polymer block (B1) are copolymer blocks of vinyl aromatic compound monomer units and conjugated diene compound monomer units, the copolymer block may comprise a plurality of portions in which vinyl aromatic compound monomer units are homogeneously distributed and/or a plurality of portions in which vinyl aromatic compound monomer units are taperingly distributed. The copolymer block portions may also comprise a plurality of portions each having a different content of the vinyl aromatic compound monomer unit.

(Exemplary Structures of Hydrogenated Block Copolymer (b2))

Examples of the aforementioned hydrogenated block copolymer (b2) include those having a structure represented by any one of the following general formulas:

$(S2-B2)_n$, $B2-(S2-B2)_n$, $[(B2-S2)_n]_m-Z$, and $[(B2-S2)_n-B2]_m-Z$.

In the above general formulas, S2 is a polymer block (S2) mainly comprising a vinyl aromatic compound monomer unit, and B2 is a polymer block (B2) mainly comprising a conjugated diene compound monomer unit.

The boundary between the polymer block (S2) and the polymer block (B2) need not necessarily be clear.

n is an integer of 1 or more, preferably an integer of 1 to 5.

m is an integer of 2 or more, preferably 2 to 11, more preferably 2 to 8.

Z represents a coupling agent residue.

The coupling agent residue herein means a residue of a coupling agent after being used to bond a plurality of copolymers comprising conjugated diene compound monomer units and vinyl aromatic hydrocarbon compound monomer units between a polymer block (S2) and a polymer block (S2), between a polymer block (B2) and a polymer block (B2), or between a polymer block (S2) and a polymer block (B2).

Examples of the coupling agent includes bifunctional coupling agents and multifunctional coupling agents.

Examples of the bifunctional group coupling agent include but not limited to, dihalogen compounds such as dimethyldichlorosilane and dimethyldibromosilane; and acid esters such as methyl benzoate, ethyl benzoate, phenyl benzoate, and phthalates.

Examples of the multifunctional coupling agent having three or more functional groups include, but not limited to, trihydric or more polyalcohols, epoxidized soybean oil, polyvalent epoxy compounds such as diglycidyl bisphenol A; halogenated silicon compounds represented by the formula $R1_{(4-n)}SiX_n$ (wherein, R1 is a hydrocarbon group having 1 to 20 carbon atoms, X is a halogen, and n is an integer of 3 or 4), and halogenated tin compounds.

Examples of the halogenated silicon compound includes, but not limited to, methylsilyl trichloride, t-butylsilyl trichloride, silicon tetrachloride, and brominated products thereof.

Examples of the halogenated tin compound include, but not limited to, polyvalent halogenated compounds such as methyl tin trichloride, t-butyl tin trichloride, and tin tetrachloride. Dimethyl carbonate, diethyl carbonate, and the like also can be used.

In the above general formulas, vinyl aromatic compound monomer units in the polymer block (S2) and the polymer block (B2) may be homogeneously distributed or may be taperingly distributed. Alternatively, when the polymer block (S2) and the polymer block (B2) are copolymer blocks of vinyl aromatic compound monomer units and conjugated diene compound monomer units, the copolymer block may comprise a plurality of portions in which vinyl aromatic compound monomer units are homogeneously distributed and/or a plurality of portions in which vinyl aromatic compound monomer units are taperingly distributed. The copolymer block portions may also comprise a plurality of portions each having different content of the vinyl aromatic compound monomer unit.

As the hydrogenated block copolymer (b2), structures represented by the following general formulas are particularly preferred.

That is, structures in which a polymer block (B-2), of polymer blocks mainly comprising a conjugated diene compound (B2), is present at a terminal of the hydrogenated block copolymer (b2) are particularly preferred.

$S2-B2-S2-(B-2)$ $S2-(B2-S2)_n-(B-2)$, and $(B-2)-S2-(B2-S2)_n-(B-2)$ (Intermediate Layer)

The tube of the present embodiment may have a configuration in which a predetermined intermediate layer is provided between the outer layer and the inner layer.

In this case, the intermediate layer preferably comprises the hydrogenated block copolymer (a).

The thickness of the intermediate layer is preferably 10 to 3,000 μm, more preferably 20 to 2,000 μm, still more preferably 30 to 1,000 μm.

When the above configuration is provided, a tube can be provided having excellent kink resistance and strain recoverability.

(Properties of Tube in Wide Angle X-Ray Diffraction Measurement)

In wide angle X-ray diffraction measurement of the tube of the present embodiment, the intensity ratio of the diffraction peak intensity at a scattering angle (2θ) of 15° (I(15)) to the diffraction peak intensity at a scattering angle (2θ) of 14° (I(14)), (I(14)/I(15)), is preferably 0.1 or more and less than 1.40. The ratio is more preferably 0.2 or more and 1.35 or less, still more preferably 0.5 or more and 1.30 or less.

Having the above configuration, a tube can be provided having excellent transparency, flexibility, kink resistance, and strain recoverability.

The peak intensity can be controlled by means of the blending ratio of the hydrogenated block copolymer (a), the type of the polypropylene resin, and the method for producing the tube and can be measured by the method described in examples mentioned below.

In the tube of the present embodiment, it is preferred that the integrated amount of elution at −20° C. or less measured by cross-fractionation chromatography (hereinafter, referred to as "CFC") be 0.1% or more and less than 40% based on the total volume, the integrated amount of elution in the range of more than −20° C. and less than 60° C. be 40% or more and less than 95% based on the total volume, and the integrated amount of elution in the range of 60° C. or more and 150° C. or less be 5% or more and less than 60% based on the total volume.

Having the above configuration, a tube can be provided having excellent low stickiness and kink resistance.

From the similar viewpoint, the above integrated amount of elution at −20° C. or less is more preferably 2% or more and less than 30%, still more preferably 3% or more and less than 20% based on the total volume.

The integrated amount of elution in the range of more than −20° C. and less than 60° C. is more preferably 50% or more and less than 90%, still more preferably 55% or more and less than 80% based on the total volume.

The above integrated amount of elution in the range of 60° C. or more and 150° C. or less is more preferably 10% or more and less than 50%, still more preferably 20% or more and less than 45% based on the total volume.

The above amount of CFC elution can be controlled by adjusting the ratio of the polymer blocks (C) and (B), the blending ratio of the hydrogenated block copolymer (a), and the type of the polypropylene resin, and the above amount of CFC elution can be measured by the method described in examples mentioned below.

Further, an eluate each in the range of −20° C. or less, in the range of more than −20° C. and less than 60° C., and in the range of 60° C. or more and 150° C. or less can be collected, and it is possible to measure the content of the vinyl aromatic unit, ratio of hydrogenation, the amount of butylene and/or amount of propylene, crystallization peak temperature and crystallization heat quantity, and Shore A hardness for each component by method mentioned below. Particularly, the hydrogenated block copolymer (a) is included in the range of more than −20° C. and less than 60° C. in detection of the integrated amount of elution.

In the tube of the present embodiment, the molecular weight distribution (Mw/Mn) of the eluted component in the range of 10° C. or more and less than 60° C. measured by cross-fractionation chromatography (CFC) is preferably 1.05 or more and 1.50 or less, from the viewpoint of dispersion homogeneity into PP.

The molecular weight distribution of the eluted component in the range of 10° C. or more and less than 60° C. measured by CFC is more preferably 1.02 or more and 1.28 or less, still more preferably 1.03 or more and 1.25 or less.

The molecular weight distribution of the eluted component in the range of 10° C. or more and less than 60° C. measured by CFC can be controlled within the above range by appropriately setting the polymerization time, amount of polar substance to be added, and polymerization temperature.

(Method for Producing Materials Constituting Each of Layers of Tube)

After appropriate selection of, for example, a hydrogenated block copolymer (a), a polypropylene resin, a hydrogenated block copolymer (b1), a hydrogenated block copolymer (b2), and other components added as required, resin materials constituting each of layers of the tube of the present embodiment can be produced by a method including dry-blending these components, a method including adjusting these components with an apparatus usually provided for mixing polymer substances, or the like.

Examples of the mixing apparatus include, but not particularly limited to, kneading apparatuses such as Bumbary mixers, Labo Plastomills, single screw extruders, and twin screw extruders. Production by a melt mixing method using an extruder is preferred from the viewpoint of productivity and good kneadability.

The melting temperature on kneading can be set as appropriate and is usually in the range of 130 to 300° C., preferably in the range of 150 to 250° C.

(Method for Forming Tube)

A method for forming the tube of the present embodiment is not particularly limited. For example, a resin composition constituted by each of materials is placed in an extruder and melted therein. The melt is passed through a die to form a tubular product, which can be water-cooled or air-cooled to be a tube. As the extruder, a single screw or multiscrew extruder can be used. A plurality of extruders can be used to form a multi-layered tube which has been formed by multilayer extrusion. Alternatively, it is possible to form a tube directly from the extruder when the resin composition is produced.

The shape of the tube is not particularly limited, and circular tubes, elliptical tubes and the like are usually used. The size of the tube is not particularly limited. For examples, the tube has preferably an outer diameter of 1 to 50 mm, more preferably an outer diameter of 2 to 30 mm, still more preferably an outer diameter of 3 to 20 mm. The thickness of tube is preferably 0.3 to 30 mm, more preferably 0.4 to 20 mm, still more preferably 0.5 to 10 mm.

The tube of the present embodiment may be a multi-layered tube formed by layering other polymers as long as the object of the present embodiment is not impaired.

One of the above polymers may be used singly as a single layer or two or more of these may be used in combination as multi-layers in which each layer may be of a different type.

The layer comprising the above polymer in the tube of the above multi-layered structure may be present as any of the innermost layer, intermediate layer, or outermost layer, depending on desired performance to be imparted.

Further, in the present embodiment, in order to prevent an increase in the thickness and maintain the flexibility as well as improve the pressure resistance and the like, a braided-reinforcing thread or a helical reinforcing member is wound around the tube to provide a pressure resistant tube (hose). As the braided-reinforcing thread, which is provided in the inside or between layers in the thickness direction, vinylon, polyamide, polyester, aramid fiber, carbon fiber, metal wire, or the like can be used. As the helical reinforcing member, which is provided on around the outer periphery, metal, plastic, or the like can be used.

The tube of the present embodiment, as shown in the following examples, has excellent transparency, flexibility, kink resistance, strain recoverability (recovery of tube clogging), and sticking resistance and can be used without particular limitation on application.

By making use of the above properties, the tube can be used in a wide variety of applications, such as home electronics applications, automobile interior and exterior parts applications, commodities, leisure goods, toys, industrial products, food manufacturing devices, and medical applications.

Of these, the tube of the present embodiment can be used particularly suitably in medical applications.

For example, single-layered or three-layered tubes having an outer diameter of 7 mm and an inner diameter of 5 mm are used for peritoneal dialysis bags or single-layered tubes having an outer diameter of 4 mm and an inner diameter of 3 mm are used for infusion bags, frequently. The tube of the present embodiment exhibits appropriate kink resistance in such shapes, and in addition is suitable in respect that the liquid therein is visible due to its high transparency.

Of these, the tube of the present embodiment can be used particularly suitably in medical applications.

EXAMPLES

The present embodiment will be now specifically described with reference to examples, but the present embodiment is not limited to these examples.

In examples and comparative examples, in accordance with methods described below, hydrogenated block copolymers were prepared, tubes were produced with the copolymers, and their physical properties were compared.

Meanwhile, properties of the hydrogenated block copolymers and physical properties of the tubes were measured as follows.

[Method for Evaluating Hydrogenated Block Copolymer]
((1) Content of Each Polymer Block Constituting Hydrogenated Block Copolymer)

About 20 mL of a polymer solution sampled from each step in the polymerization process of a block copolymer before hydrogenation was injected into a 100 mL bottle hermetically containing 0.50 mL of n-propyl benzene and about 20 mL of toluene as internal standards to prepare a sample.

This sample was measured by gas chromatography (GC-14B manufactured by SHIMADZU CORPORATION) provided with a packed column on which Apiezon grease was supported. An amount of a residual monomer in the polymer solution was determined from calibration curves of a butadiene monomer and a styrene monomer preliminarily obtained. The polymerization ratio of the butadiene monomer and the styrene monomer was confirmed to be 100%, and the content of each polymer block was calculated by the following expression.

The polymerization ratio of butadiene was measured at 90° C. under constant temperature conditions, and the polymerization ratio of styrene was measured under rising temperature conditions from 90° C. (held for 10 minutes) to 150° C. (10° C./min).

Content of each block=(Total amount of monomer fed in each step)/(Sum total amount of monomer)×100% by mass ((2) Vinyl Bond Content Before Hydrogenation of Each Polymer Block Constituting Hydrogenated Block Copolymer)

A polymer sampled from each step in the polymerization process of the block copolymer before hydrogenation was measured by proton nuclear magnetic resonance spectrometry ($^1$H-NMR).

Using a JNM-LA400 (manufactured by JEOL) as a measuring instrument and deuterated chloroform as a solvent, measurement was performed at a sample concentration of 50 mg/mL, an observation frequency of 400 MHz, a pulse delay of 2.904 sec, a number of scans of 64, a pulse width of 450, and a measurement temperature of 26° C., using tetramethylsilane as a chemical shift reference.

The vinyl bond content was calculated from a ratio of 1,4-bond to 1,2-bond after calculating an integrated value per 1H of each bond form from the integrated values of signals ascribed to 1,4-bond and 1,2-bond.

The vinyl bond content of each polymer sampled from each step in the polymerization process of the block copolymer before hydrogenation was calculated to thereby calculate the vinyl bond content of each of the block (C), block (B), and block (B1).
((3) Ratio of Hydrogenation of Unsaturated Bond Based on Conjugated Diene Compound Unit of Hydrogenated Block Copolymer)

Proton nuclear magnetic resonance spectrometry (1H-NMR) was performed by using the hydrogenated block copolymer after hydrogenation.

The measurement conditions and the processing method of measured data were the same as in (2) above.

The integrated value of a signal originating from a residual double bond at 4.5 to 5.5 ppm and the integrated value of a signal originating from the hydrogenated conjugated diene were calculated, and the ratio thereof was calculated as the ratio of hydrogenation.
((4) Content of Vinyl Aromatic Compound Unit of Hydrogenated Bock Copolymer (Hereinbelow, Also Referred to as "Styrene Content"))

Proton nuclear magnetic resonance spectrometry (1H-NMR) was performed by using copolymer after hydrogenation.

Using a JNM-LA400 (manufactured by JEOL) as a measuring instrument and deuterated chloroform as a solvent, measurement was performed at a sample concentration of 50 mg/mL, an observation frequency of 400 MHz, a pulse delay of 2.904 sec, a number of scans of 64, a pulse width of 450, and a measurement temperature of 26° C., using tetramethylsilane as a chemical shift reference.

The styrene content was calculated using the total integrated value of signals from aromatic styrene at 6.2 to 7.5 ppm in a spectrum.

The content of the vinyl aromatic compound unit of each polymer sampled from each step in the polymerization process of the block copolymer before hydrogenation was calculated to thereby calculate the content of the total vinyl aromatic compound unit and the content of the vinyl aromatic compound unit in the block (S).

((5) Amount of Butylene and/or Amount of Propylene Based on 100 Mol % of Conjugated Diene Compound Unit in Total)

Proton nuclear magnetic resonance spectrometry ($^1$H-NMR) was performed by using the hydrogenated block copolymer after hydrogenation.

The measurement conditions and the processing method of measured data were the same as in (2) and (3) above.

The integrated values of signals ascribed to butylene (hydrogenated 1,2-bond) and propylene (hydrogenated 3,4-bond) at 0 to 2.0 ppm in a spectrum were calculated, and the butylene content was calculated from the ratio between integrated values.

((6) DSC Measurement)

Ten milligrams of each hydrogenated block copolymer was weighed into an aluminum pan, and measurement using a differential scanning calorimeter (DSC) (Q2000 manufactured by TA Instruments Inc.) was performed while the temperature of the copolymer in a nitrogen atmosphere (flow rate 50 mL/min) was raised from the initial temperature at −50° C. to 150° C. at a temperature rising rate of 10° C./min, maintained at 150° C. for five minutes, and then reduced to −50° C. at 10° C./min.

The crystallization temperature (° C.) was given by the crystallization peak appearing in the temperature decreasing process of a DSC curve drawn, and the crystallization heat quantity (J/g) was given by the heat quantity represented by the crystallization peak area.

((7) Dynamic Viscoelasticity Measurement of Hydrogenated Block Copolymer)

The dynamic viscoelasticity spectrum was measured by the following method to obtain the peak height of the loss factor tan δ (maximum value (no unit)), the temperature at the peak (maximum value) (° C.), and the peak half width (° C.).

First, the hydrogenated block copolymer was formed into a sheet having a thickness of 2 mm, which was then cut into specimens for measurement having a width of 10 mm and a length of 35 mm.

The specimen was set into a twisted type geometry of an apparatus, ARES (trade name, manufactured by TA Instruments), and the dynamic viscoelasticity was measured under conditions including effective measured length: 25 mm; strain: 0.5%; frequency: 1 Hz; and measurement range: −100° C. to 100° C., and temperature rising rate: 3° C./min.

((8) Weight Average Molecular Weight of Hydrogenated Block Copolymer)

The weight average molecular weight of the hydrogenated block copolymer was determined by gel permeation chromatography (GPC) measurement (LC-10 manufactured by SHIMADZU CORPORATION), column: TSKgelGMHXL (4.6 mm ID×30 cm, two), and solvent: tetrahydrofuran (THF) as the molecular weight in terms of polystyrene by means of commercially available standard polystyrene.

((9) Melt Flow Rate of Hydrogenated Block Copolymer (Hereinafter, Also Referred to as "MFR"))

The MFR of each of the hydrogenated block copolymer and the propylene resin was measured in compliance with ISO 1133 at 230° C. under a load of 2.16 kg.

((10) Shore A Hardness of Hydrogenated Block Copolymer)

For the Shore A hardness of the hydrogenated block copolymer (in compliance with ASTM D-2240), four compression-molded sheets having a thickness of 2 mm were stacked, and a momentary value thereof was measured with a durometer type A.

[Method for Evaluating Properties of Tube]

((1) Wide Angle X-Ray Diffraction Measurement of Tubular Molded Article)

A tubular molded article each obtained in examples and comparative examples as a test specimen, and a nanoscale X-ray structural characterization instrument NANO-Viewer manufactured by Rigaku Corp. were used. An X-ray having a wavelength of 0.154 nm collimated using a point collimation (first slit: 0.4 mmϕ, second slit: 0.2 mmϕ, and guard slit: 0.8 mmϕ), as an optical system, was allowed to circumferentially enter the side of the tubular molded article that had been cut out, in parallel to the surface of the molded article (edge incidence).

In this case, the thickness of the specimen in the X-ray incidence direction was equal to or smaller than the thickness of the tube.

An imaging plate was used as a detector. The camera length was 74.5 mm, and the exposure time was 15 minutes.

To prevent scattering due to air, the space from the second slit to the detector was evacuated of air.

With respect to scattering, the blank cell scattering correction and the instrument back ground correction were carried out.

The obtained two-dimensional scattering pattern in the range of −15°<χ<15° (χ: azimuth defined by taking the thickness direction of the molded article as 00) was sector-averaged to obtain a one-dimensional scattering profile.

A line connecting the scattering intensity at 2θ=50 and the scattering intensity at 2θ=300 in the obtained scattering profile was taken as the base line. The intensity of the scattering peak top existing at 2θ=140 from the base line (scattering caused by the (110) surface of a crystal of a polypropylene resin) was represented by I(14), and the scattering intensity at 2θ=150 from the base line was represented by I(15). Then, the ratio of the intensities, I(14)/I(15), was calculated.

((2) Transparency of Tubular Molded Article)

Five tubular molded articles obtained in each of examples and comparative examples were arranged in a quartz cell, which was then filled with paraffin oil. A haze meter (NDH-1001DP manufactured by NIPPON DENSHOKU INDUSTRIES CO., LTD) was used to measure the haze value (%), which was used as the index of the transparency.

With the obtained haze value, the molded article was evaluated based on the following criteria.

Single-Layered Tube Criteria
  5: Haze value of less than 15%
  4: Haze value of 15% or more and less than 20%
  3: Haze value of 20% or more and less than 25%
  2: Haze value of 25% or more and less than 30%
  1: Haze value of 30% or more Three-Layered Tube Criteria
  5: Haze value of less than 20%
  4: Haze value of 20% or more and less than 25%
  3: Haze value of 25% or more and less than 30%
  2: Haze value of 30% or more and less than 40%
  1: Haze value of 40% or more ((3) Flexibility of Tubular Molded Article)

From a tubular molded article obtained in each of examples and comparative examples, a sample having a width of 3 mm in the take-off direction was cut out.

Using the sample, tensile modulus (MPa) was measured by a tensile testing machine (Minebea Inc., Tg-5 kN) at a tension rate of 100 mm/min and used as the index of the flexibility.

With the obtained tensile modulus, the molded article was evaluated based on the following criteria.

5: Tensile modulus of less than 25 MPa
4: Tensile modulus of 25 MPa or more and less than 30 MPa
3: Tensile modulus of 30 MPa or more and less than 35 MPa
2: Tensile modulus of 35 MPa or more and less than 45 MPa
1: Tensile modulus of 45 MPa or more ((4) Kink Resistance of Tubular Molded Article)

A tubular molded article obtained in each of examples and comparative examples was used to measure the stress when the tube was bent by a tensile compression testing machine. Specifically, using a tube having a length of 30 cm as the subject, the chuck-to-chuck distance was set to 10 cm, and bending measurement was carried out at a crosshead speed of 200 mm/min.

An exemplary stress curve obtained from the relation between stress and chuck-to-chuck distance is shown in FIG. 1.

In the example of FIG. 1, the chuck-to-chuck distance at the maximum stress (X in FIG. 1) was defined as the chuck-to-chuck distance at the moment at which the tube kinked (kink position). Considering that a tube having a larger chuck-to-chuck distance corresponding to this kink position had a more satisfactory kink resistance, the tube was evaluated based on the following criteria.
5: Kink position of 60 mm or more
4: Kink position of 56 mm or more and less than 60 mm
3: Kink position of 53 mm or more and less than 56 mm
2: Kink position of 50 mm or more and less than 53 mm
1: Kink position of less than 50 mm ((5) Sticking Resistance of Tubular Molded Article)

A tubular molded article each obtained in examples and comparative examples was used as a test specimen, and the sticking resistance was evaluated using a friction tester (KES-SE manufactured by KATO TECH CO., LTD.).

A tube having a length of 2 cm was cut out and mounted on the inner layer sensor unit. A tube having a length of 10 cm was fixed on the sample table such that the specimen on the sensor unit came in contact with the tube.

The test conditions included a sweep speed of 1 mm/second and a load of 25 g. The obtained friction coefficient μ (dimensionless) was evaluated based on the following criteria.
5: Friction coefficient of less than 0.9
4: Friction coefficient of 0.9 or more and less than 1.5
3: Friction coefficient of 1.5 or more and less than 2.1
2: Friction coefficient of 2.1 or more and less than 2.7
1: Friction coefficient of 2.7 or more ((6) Strain Recoverability of Tubular Molded Article)

Tubular molded articles obtained in each of examples and comparative examples were used. One kilogram of a load having a width of 1 cm was placed on two tubes, which were pressurized and maintained at 23° C. for 6 hours. Thereafter, the pressure was released, and the thickness after 30 minutes was measured to evaluate the residual strain.

With the obtained residual strain, the molded article was evaluated based on the following criteria.
5: Residual strain of less than 10%
4: Residual strain of 10% or more and less than 20%
3: Residual strain of 20% or more and less than 30%
2: Residual strain of 30% or more and less than 50%
1: Residual strain of 50% or more ((7) CFC measurement of Tubular Molded Article)

A molded article obtained in each of examples and comparative examples shown in Table 2 and Table 3 was used as a test sample to measure an elution temperature-amount of elution curve by temperature rising fractionation as follows. Determined were the amount of elution at each temperature, the integrated amount of elution, and the molecular weight distribution of the eluted component.

First, the temperature of columns containing filler was raised to 145° C. A sample solution of the hydrogenated block copolymer composition dissolved in ortho-dichlorobenzene was introduced into the columns, which were maintained at 140° C. for 30 minutes. Then, the temperature of the columns was reduced to −20° C. at a temperature decreasing rate of 1° C./min, and then, the columns were maintained for 60 minutes to allow the sample to precipitate on the filler surface.

Thereafter, the temperature of the columns was sequentially raised at a temperature rising rate of 40° C./min in increments of 5° C. The concentration of the sample eluted at each temperature was detected. Then, using values of the amount of the sample eluted (% by mass) and the temperature inside the columns at this time (° C.), an elution temperature-amount of elution curve was measured to determine the amount of elution and the molecular weight distribution at each temperature.

Instrument: CFC-type cross-fractionation chromatograph (manufactured by Polymer Char, S.A.)
Detector: IR-type infrared spectrometer (manufactured by Polymer Char, S.A.)
Detected wavelength: 3.42 μm
Column: Shodex HT-806M×3 (Showa Denko K.K.)
Column calibration: monodispersed polystyrene (TOSOH CORPORATION)
Molecular weight calibration method: standard sample calibration method (in terms of polystyrene)
Eluant: ortho-dichlorobenzene
Flow rate: 1.0 mL/min
Sample concentration: 120 mg/30 mL
Volume injected: 0.5 mL From the obtained elution temperature-amount of elution curve, determined were the integrated amount of elution in the total volume (%) at −20° C. or less, the integrated amount of elution in the total volume (%) in the range of more than −20° C. and less than 60° C., the integrated amount of elution in the total volume (%) in the range of 60° C. or more and 150° C. or less, and the molecular weight distribution of the eluted component at 10 to 60° C.

((8) Performance Balance)

A tube having a total score of the items of 17 or more and having no item rated one was considered to have an excellent performance balance.

[Method for Producing Hydrogenated Block Copolymer (a)]

(Preparation of Hydrogenated Catalyst)

The hydrogenated catalyst used in hydrogenated reaction of the hydrogenated block copolymer was produced by the following method.

To a reaction vessel purged with nitrogen, 1 L of cyclohexane dried and purified was loaded, and 100 mmol of bis(η5-cyclopentadienyl)titanium dichloride was added thereto. A n-hexane solution including 200 mmol of trimethyl aluminum was added thereto with sufficient stirring, and the mixture was subjected to a reaction at room temperature for about 3 days.

Production Example 1: Hydrogenated Block Copolymer (a-1)

A tank-type reactor having a capacity of 10 L equipped with a stirrer and a jacket was used to carry out batch polymerization.

One liter of cyclohexane was placed into the reactor, and then, 0.050 parts by mass of n-butyl lithium (hereinafter, also referred to as "Bu-Li") based on 100 parts by mass of the whole monomers and 0.05 mol of N,N,N',N'-tetramethylethylenediamine (hereinafter, also referred to as "TMEDA"), as a vinylating agent, based on 1 mol of Bu-Li were added.

As a first step, a cyclohexane solution containing 10 parts by mass of butadiene (concentration of 20% by mass) was added over 10 minutes. Thereafter, polymerization was carried out for further 10 minutes.

During polymerization, the temperature was controlled to 65° C.

Then, as a second step, 1.50 mol of TMEDA and 0.05 mol of sodium t-pentoxide (hereinafter, referred to as NaOAm) were added based on 1 mol of Bu-Li. A cyclohexane solution containing 85 parts by mass of butadiene (concentration 20% by mass) was added over 60 minutes, followed by polymerization for further 10 minutes.

During polymerization, the temperature was controlled to 60° C.

Then, as a third step, a cyclohexane solution containing 5 parts by mass of styrene (concentration 20% by mass) was added over five minutes followed by polymerization for further 10 minutes. During polymerization, the temperature was controlled to 65° C.

The polymer obtained in the adjustment process of the block copolymer was sampled in each step. The analysis values of the obtained block copolymer were a styrene content of 5% by mass, a weight average molecular weight of 249,000, and a molecular weight distribution of 1.12.

Subsequently, to the obtained block copolymer, the hydrogenated catalyst described above was added at 100 ppm in terms of titanium based on 100 parts by mass of the block copolymer, and hydrogenation reaction was carried out at a hydrogen pressure of 0.7 MPa and a temperature of 70° C.

Thereafter, methanol was added, and then, as a stabilizer, 0.3 parts by mass of octadecyl-3-(3,5-di-t-butyl-4-hydroxyphenyl)propionate was added to the block copolymer.

The obtained hydrogenated block copolymer (a-1) had a ratio of hydrogenation of 99.5% and a MFR of 2 g/10 min.

The analysis results of the obtained hydrogenated block copolymer (a-1) are shown in Table 1.

Production Example 2: Hydrogenated Block Copolymer (a-2)

0.050 parts by mass of Bu-Li, 10 parts by mass of butadiene in the first step, 82 parts by mass of butadiene in the second step, and 5 parts by mass of styrene in the third step were used. A fourth step was added, in which a cyclohexane solution containing 3 parts by mass of butadiene (concentration 20% by mass) was added over five minutes followed by polymerization for further 10 minutes.

A hydrogenated block copolymer (a-2) was produced by carrying out the same operation as for the hydrogenated block copolymer (a-1) except that the temperature during polymerization was controlled to 65° C. to produce the copolymer.

The obtained hydrogenated block copolymer (a-2) had a styrene content of 5% by mass, a weight average molecular weight of 251,000, a molecular weight distribution of 1.14, a ratio of hydrogenation of 99.8%, and a MFR of 4 g/10 min.

The analysis results of the obtained hydrogenated block copolymer (a-2) are shown in Table 1.

Production Example 3: Hydrogenated Block Copolymer (a-3)

A hydrogenated block copolymer (a-3) was produced by carrying out the same operation as for the hydrogenated block copolymer (a-1) except that 0.060 parts by mass of Bu-Li, 15 parts by mass of butadiene in the first step, 78 parts by mass of butadiene in the second step, and 7 parts by mass of styrene in the third step were used to produce the block copolymer.

The obtained hydrogenated block copolymer (a-3) had a styrene content of 7% by mass, a weight average molecular weight of 204,000, a molecular weight distribution of 1.19, a ratio of hydrogenation of 99.66%, and a MFR of 2.9 g/10 min.

The analysis results of the obtained hydrogenated block copolymer (a-3) are shown in Table 1.

Production Example 4: Hydrogenated Block Copolymer (a-4)

A hydrogenated block copolymer (a-4) was produced by carrying out the same operation as for the hydrogenated block copolymer (a-1) except that 0.053 parts by mass of Bu-Li, 3 parts by mass of butadiene in the first step, 85 parts by mass of butadiene in the second step, and 12 parts by mass of styrene in the third step were used to produce the block copolymer.

The obtained hydrogenated block copolymer (a-4) had a styrene content of 12% by mass, a weight average molecular weight of 225,000, a molecular weight distribution of 1.22, a hydrogenation ratio of 99.3%, and a MFR of 1.9 g/10 min.

The analysis results of the obtained hydrogenated block copolymer (a-4) are shown in Table 1.

Production Example 5: Hydrogenated Block Copolymer (a-5)

A hydrogenated block copolymer (a-5) was produced by carrying out the same operation as for the hydrogenated block copolymer (a-1) except that 0.042 parts by mass of Bu-Li, 6 parts by mass of butadiene in the first step, 91 parts by mass of butadiene in the second step, and 3 parts by mass of styrene in the third step were used to produce the block copolymer.

The obtained hydrogenated block copolymer (a-5) had a styrene content of 3% by mass, a weight average molecular weight of 282,000, a molecular weight distribution of 1.29, a hydrogenation ratio of 98.6%, and a MFR of 3.9 g/10 min.

The analysis results of the obtained hydrogenated block copolymer (a-5) are shown in Table 1.

Production Example 6: Hydrogenated Block Copolymer (a-6)

A hydrogenated block copolymer (a-6) was produced by carrying out the same operation as for the hydrogenated block copolymer (a-1) except that 0.078 parts by mass of Bu-Li, 16 parts by mass of butadiene in the first step, 72 parts by mass of butadiene in the second step, and 12 parts by mass of styrene in the third step were used to produce the block copolymer.

The obtained hydrogenated block copolymer (a-6) had a styrene content of 12% by mass, a weight average molecular weight of 161,000, a molecular weight distribution of 1.12, a hydrogenation ratio of 99.0%, and a MFR of 1.5 g/10 min.

The analysis results of the obtained hydrogenated block copolymer (a-6) are shown in Table 1.

Comparative Production Example 1: Hydrogenated Block Copolymer (a-7)

A hydrogenated block copolymer (a-7) was produced by carrying out the same operation as for the hydrogenated block copolymer (a-1) except that 0.099 parts by mass of Bu-Li, 17 parts by mass of butadiene in the first step, 67 parts by mass of butadiene in the second step, and 16 parts by mass of styrene in the third step were used to produce the block copolymer.

The obtained hydrogenated block copolymer (a-7) had a styrene content of 16% by mass, a weight average molecular weight of 117,000, a molecular weight distribution of 1.09, a hydrogenation ratio of 99.2%, and a MFR of 1.8 g/10 min.

The analysis results of the obtained hydrogenated block copolymer (a-7) are shown in Table 1.

Comparative Production Example 2: Hydrogenated Block Copolymer (a-8)

A hydrogenated block copolymer (a-8) was produced by carrying out the same operation as for the hydrogenated block copolymer (a-1) except that 0.050 parts by mass of Bu-Li, 20 parts by mass of butadiene in the first step, and 80 parts by mass of butadiene in the second step were used to produce the block copolymer.

The obtained hydrogenated block copolymer (a-8) had a styrene content of 0% by mass, a weight average molecular weight of 250,000, a molecular weight distribution of 1.08, a hydrogenation ratio of 99.5%, and a MFR of 32 g/10 min.

The analysis results of the obtained hydrogenated block copolymer (a-8) are shown in Table 1.

Comparative Production Example 3: Hydrogenated Block Copolymer (a-9)

A hydrogenated block copolymer (a-9) was produced by carrying out the same operation as for the hydrogenated block copolymer (a-1) except that 0.122 parts by mass of Bu-Li, 5 parts by mass of butadiene in the first step, 70 parts by mass of butadiene in the second step, and 25 parts by mass of styrene in the third step were used to produce the block copolymer.

The obtained hydrogenated block copolymer (a-9) had a styrene content of 25% by mass, a weight average molecular weight of 88,000, a molecular weight distribution of 1.11, a hydrogenation ratio of 99.0%, and a MFR of 3.1 g/10 min.

The analysis results of the obtained hydrogenated block copolymer (a-9) are shown in Table 1.

Comparative Production Example 4: Hydrogenated Block Copolymer (a-10)

A hydrogenated block copolymer (a-10) was produced by carrying out the same operation as for the hydrogenated block copolymer (a-1) except that 0.072 parts by mass of Bu-Li, 35 parts by mass of butadiene in the first step, 63 parts by mass of butadiene in the second step, and 2 parts by mass of styrene in the third step were used to produce the block copolymer.

The obtained hydrogenated block copolymer (a-10) had a styrene content of 2% by mass, a weight average molecular weight of 169,000, a molecular weight distribution of 1.12, a hydrogenation ratio of 98.3%, and a MFR of 4.8 g/10 min.

The analysis results of the obtained hydrogenated block copolymer (a-10) are shown in Table 1.

Comparative Production Example 5: Hydrogenated Block Copolymer (a-11)

A hydrogenated block copolymer (a-11) was produced by carrying out the same operation as for the hydrogenated block copolymer (a-1) except that 0.065 parts by mass of Bu-Li, 8 parts by mass of styrene in the first step, 85 parts by mass of butadiene in the second step, and 7 parts by mass of styrene in the third step were used to produce the block copolymer.

The obtained hydrogenated block copolymer (a-11) had a styrene content of 15% by mass, a weight average molecular weight of 178,000, a molecular weight distribution of 1.12, a hydrogenation ratio of 99.2%, and a MFR of 4.8 g/10 min.

The analysis results of the obtained hydrogenated block copolymer (a-11) are shown in Table 1.

Comparative Production Example 6: Hydrogenated Block Copolymer (a-12)

A hydrogenated block copolymer (a-12) was produced by carrying out the same operation as for the hydrogenated block copolymer (a-1) except that 0.050 parts by mass of Bu-Li, 0.250 mol of TMEDA before the first step, 10 parts by mass of butadiene in the first step, 85 parts by mass of butadiene in the second step, and 5 parts by mass of styrene in the third step were used to produce the block copolymer.

The obtained hydrogenated block copolymer (a-12) had a styrene content of 5% by mass, a weight average molecular weight of 248,000, a molecular weight distribution of 1.16, a hydrogenation ratio of 99.1%, and a MFR of 9.2 g/10 min.

The analysis results of the obtained hydrogenated block copolymer (a-12) are shown in Table 1.

Comparative Production Example 7: Hydrogenated Block Copolymer (a-13)

After a block copolymer was produced by carrying out the same operation as for the hydrogenated block copolymer (a-1), a hydrogenated block copolymer (a-13) having a controlled ratio of hydrogenation was produced.

The obtained hydrogenated block copolymer (a-13) had a styrene content of 5% by mass, a weight average molecular weight of 253,000, a molecular weight distribution of 1.15, a hydrogenation ratio of 70.0%, and a MFR of 15.2 g/10 min.

The analysis results of the obtained hydrogenated block copolymer (a-13) are shown in Table 1.

Comparative Production Example 8: Hydrogenated Block Copolymer (a-14)

A hydrogenated block copolymer (a-14) was produced by carrying out the same operation as for the hydrogenated block copolymer (a-1) except that 0.055 parts by mass of Bu-Li and 0.65 mol of TMEDA before the second step were used and no NaOAm was added to produce the block copolymer.

The obtained hydrogenated block copolymer (a-14) had a styrene content of 5% by mass, a weight average molecular weight of 239,000, a molecular weight distribution of 1.08, a hydrogenation ratio of 99.4%, and a MFR of 2.9 g/10 min.

The analysis results of the obtained hydrogenated block copolymer (a-14) are shown in Table 1.

Comparative Production Example 9: Hydrogenated Block Copolymer (a-15)

A hydrogenated block copolymer (a-15) was produced by carrying out the same operation as for the hydrogenated block copolymer (a-1) except that using 0.055 parts by mass of Bu-Li, 15 parts by mass of butadiene in the first step, 70 parts by mass of butadiene in the second step, 15 parts by mass of styrene in the third step, and 0.65 mol of TMEDA before the second step were used and no NaOAm was added to produce the block copolymer.

The obtained hydrogenated block copolymer (a-15) had a styrene content of 15% by mass, a weight average molecular weight of 249,000, a molecular weight distribution of 1.08, a hydrogenation ratio of 99.0%, and a MFR of 3.2 g/10 min.

The analysis results of the obtained hydrogenated block copolymer (a-15) are shown in Table 1.

Production Example 7: Hydrogenated Block Copolymer (a-16)

A hydrogenated block copolymer (a-16) was produced by carrying out the same operation as for the hydrogenated block copolymer (a-1) except that 0.048 parts by mass of Bu-Li, 2 parts by mass of butadiene in the first step, 83 parts by mass of butadiene in the second step, and 15 parts by mass of styrene in the third step were used to produce the block copolymer.

The obtained hydrogenated block copolymer (a-16) had a styrene content of 15% by mass, a weight average molecular weight of 262,000, a molecular weight distribution of 1.15, a ratio of hydrogenation of 98.9%, and a MFR of 3.2 g/10 min.

The analysis results of the obtained hydrogenated block copolymer (a-16) are shown in Table 1.

Production Example 8: Hydrogenated Block Copolymer (a-17)

A hydrogenated block copolymer (a-17) was produced by carrying out the same operation as for the hydrogenated block copolymer (a-1) except that 0.050 parts by mass of Bu-Li, 2 parts by mass of butadiene in the first step, 96 parts by mass of butadiene in the second step, and 2 parts by mass of styrene in the third step were used to produce the block copolymer.

The obtained hydrogenated block copolymer (a-17) had a styrene content of 2% by mass, a weight average molecular weight of 252,000, a molecular weight distribution of 1.13, a hydrogenation ratio of 99.3%, and a MFR of 2.8 g/10 min.

The analysis results of the obtained hydrogenated block copolymer (a-17) are shown in Table 1.

Production Example 9: Hydrogenated Block Copolymer (a-18)

A hydrogenated block copolymer (a-18) was produced by carrying out the same operation as for the hydrogenated block copolymer (a-1) except that 0.050 parts by mass of Bu-Li, 18 parts by mass of butadiene in the first step, 80 parts by mass of butadiene in the second step, and 2 parts by mass of styrene in the third step were used to produce the block copolymer.

The obtained hydrogenated block copolymer (a-18) had a styrene content of 2% by mass, a weight average molecular weight of 232,000, a molecular weight distribution of 1.18, a hydrogenation ratio of 99.5%, and a MFR of 3.0 g/10 min.

The analysis results of the obtained hydrogenated block copolymer (a-18) are shown in Table 1.

Production Example 10: Hydrogenated Block Copolymer (a-19)

A hydrogenated block copolymer (a-19) was produced by carrying out the same operation as for the hydrogenated block copolymer (a-1) except that 0.050 parts by mass of Bu-Li, 2 parts by mass of butadiene in the first step, 85 parts by mass of butadiene in the second step, and 13 parts by mass of styrene in the third step were used to produce the block copolymer.

The obtained hydrogenated block copolymer (a-19) had a styrene content of 13% by mass, a weight average molecular weight of 272,000, a molecular weight distribution of 1.15, a hydrogenation ratio of 99.2%, and a MFR of 2.7 g/10 min.

The analysis results of the obtained hydrogenated block copolymer (a-19) are shown in Table 1.

Production Example 11: Hydrogenated Block Copolymer (a-20)

A hydrogenated block copolymer (a-20) was produced by carrying out the same operation as for the hydrogenated block copolymer (a-1) except that 0.050 parts by mass of Bu-Li, 12 parts by mass of butadiene in the first step, 73 parts by mass of butadiene in the second step, and 15 parts by mass of styrene in the third step were used to produce the block copolymer.

The obtained hydrogenated block copolymer (a-20) had a styrene content of 15% by mass, a weight average molecular weight of 252,000, a molecular weight distribution of 1.19, a hydrogenation ratio of 99.8%, and a MFR of 3.2 g/10 min.

The analysis results of the obtained hydrogenated block copolymer (a-20) are shown in Table 1.

Production Example 12: Hydrogenated Block Copolymer (a-21)

A hydrogenated block copolymer (a-21) was produced by carrying out the same operation as for the hydrogenated block copolymer (a-2) except that 0.050 parts by mass of Bu-Li, 12 parts by mass of butadiene in the first step, 82 parts by mass of butadiene in the second step, 6 parts by mass of styrene in the third step, and 15 parts by mass of butadiene in the fourth step were used to produce the block copolymer.

The obtained hydrogenated block copolymer (a-21) had a styrene content of 6% by mass, a weight average molecular weight of 242,000, a molecular weight distribution of 1.19, a hydrogenation ratio of 99.5%, and a MFR of 6.4 g/10 min.

The analysis results of the obtained hydrogenated block copolymer (a-21) are shown in Table 1.

TABLE 1

| | | | (Polymerization order) Structural composition (% by mass) | | | | | | Vinyl bond content before hydro-genation (mol %) | | | A-mount of bu-tylene (mol %) | Ratio of hydro-genation (mol %) | DSC crystallization | | Shore A hard-ness | Tanδ Temperature at peak (max-imum value) ° C. | Peak height (maxi-mum value) No unit | Peak half width ° C. |
|---|---|---|---|---|---|---|---|---|---|---|---|---|---|---|---|---|---|---|---|
| | | Structure | (S) | (C) | (B) | (S) | (B1) | (C + S) | (C) | (B) | (B1) | | | Tem-per-ature ° C. | Heat quan-tity J/g | | | | |
| Production Example 1 | a-1 | C-B-S | 0 | 10 | 85 | 5 | 0 | 15 | 15 | 78 | 0 | 71 | 99.5 | 36.0 | 3.5 | 45 | −27.0 | 1.82 | 15.7 |
| Production Example 2 | a-2 | C-B-S-B1 | 0 | 10 | 82 | 5 | 3 | 15 | 13 | 75 | 74 | 68 | 99.8 | 35.0 | 3.7 | 38 | −29.0 | 1.95 | 13.5 |
| Production Example 3 | a-3 | C-B-S | 0 | 15 | 78 | 7 | 0 | 22 | 18 | 82 | 0 | 72 | 99.6 | 44.0 | 4.8 | 53 | −24.5 | 1.25 | 17.1 |
| Production Example 4 | a-4 | C-B-S | 0 | 3 | 85 | 12 | 0 | 15 | 10 | 77 | 0 | 75 | 99.3 | 8.0 | 1.5 | 36 | −28.0 | 1.55 | 16.6 |
| Production Example 5 | a-5 | C-B-S | 0 | 6 | 91 | 3 | 0 | 9 | 11 | 70 | 0 | 66 | 98.6 | 31.0 | 1.8 | 29 | −37.0 | 2.05 | 12.6 |
| Production Example 6 | a-6 | C-B-S | 0 | 16 | 72 | 12 | 0 | 28 | 18 | 83 | 0 | 71 | 99.0 | 48.0 | Si | 62 | −24.0 | 1.02 | 18.9 |
| Comparative Production Example 1 | a-7 | C-B-S | 0 | 17 | 67 | 16 | 0 | 33 | 13 | 77 | 0 | 64 | 99.2 | 51.0 | 6.0 | 68 | −28.0 | 0.91 | 19.7 |
| Comparative Production Example 2 | a-8 | C-B | 0 | 20 | 80 | 0 | 0 | 20 | 17 | 80 | 0 | 67 | 99.5 | 55.0 | 7.3 | 13 | −25.5 | 2.25 | 10.1 |
| Comparative Production Example 3 | a-9 | C-B-S | 0 | 5 | 70 | 25 | 0 | 30 | 15 | 78 | 0 | 74 | 99.0 | 19.0 | 1.7 | 66 | −27.0 | 1.10 | 21.5 |
| Comparative Production Example 4 | a-10 | C-B-S | 0 | 35 | 63 | 2 | 0 | 37 | 15 | 77 | 0 | 55 | 98.3 | 82.0 | 11.2 | 67 | −28.0 | 0.65 | 19.9 |
| Comparative Production Example 5 | a-11 | S-B-S | 8 | 0 | 85 | 7 | 0 | 15 | 15 | 78 | 76 | 78 | 99.2 | — | 0.0 | 43 | −27.0 | 1.67 | 17.8 |
| Comparative Production Example 6 | a-12 | C-B-S | 0 | 10 | 85 | 5 | 0 | 15 | 35 | 78 | 0 | 73 | 99.1 | — | 0.0 | 31 | −27.0 | 2.10 | 14.2 |
| Comparative Production Example 7 | a-13 | C-B-S | 0 | 10 | 85 | 5 | 0 | 15 | 15 | 80 | 0 | 69 | 70.0 | — | 0.0 | 28 | −41.0 | 1.89 | 16.3 |
| Comparative Production Example 8 | a-14 | C-B-S | 0 | 10 | 85 | 5 | 0 | 15 | 15 | 50 | 0 | 46 | 99.4 | 43.0 | 3.5 | 61 | −49.0 | 1.05 | 18.7 |
| Comparative Production Example 9 | a-15 | C-B-S | 0 | 15 | 70 | 15 | 0 | 30 | 13 | 44 | 0 | 39 | 99.0 | 52.0 | 5.3 | 68 | −44.0 | 0.95 | 19.5 |
| Production Example 7 | a-16 | C-B-S | 0 | 2 | 83 | 15 | 0 | 17 | 14 | 81 | 0 | 79 | 98.9 | 6.0 | 1.2 | 35 | −28.5 | 1.55 | 16.3 |
| Production Example 8 | a-17 | C-B-S | 0 | 2 | 96 | 2 | 0 | 4 | 12 | 80 | 0 | 79 | 99.3 | 7.0 | 1.4 | 25 | −28.0 | 2.25 | 10.3 |
| Production Example 9 | a-18 | C-B-S | 0 | 18 | 80 | 2 | 0 | 20 | 15 | 81 | 0 | 69 | 99.5 | 50.0 | 5.4 | 48 | −27.5 | 1.15 | 16..3 |
| Production Example 10 | a-19 | C-B-S | 0 | 2 | 85 | 13 | 0 | 15 | 12 | 78 | 0 | 76 | 99.2 | 7.0 | 1.3 | 46 | −27.0 | 1.90 | 16.0 |
| Production Example 11 | a-20 | C-B-S | 0 | 12 | 73 | 15 | 0 | 27 | 14 | 75 | 0 | 66 | 99.8 | 38.0 | 4.1 | 60 | −29.0 | 1.04 | 17.3 |
| Production Example 12 | a-21 | C-B-S-B1 | 0 | 12 | 82 | 6 | 15 | 18 | 12 | 80 | 78 | 72 | 99.5 | 37.0 | 3.9 | 30 | −26.0 | 1.43 | 14.5 |

[Hydrogenated Block Copolymers (b1), (b2), and (b3)]

Hydrogenated block copolymer (b1): H1062 manufactured by Asahi Kasei Chemicals Corporation Hydrogenated block copolymer (b2): H1221 manufactured by Asahi Kasei Chemicals Corporation Hydrogenated block copolymer (b3): the polymer was obtained in the same manner as the production example 4 in WO2010/104068.

[Polypropylene Resin]

The polypropylene resins used in examples and comparative examples were as follows:

Polypropylene resin (c1): "PC630A" manufactured by SunAllomer Ltd. (propylene-ethylene random copolymer, MFR=7.5 g/10 min) and Polypropylene resin (c2): "PM931" manufactured by SunAllomer Ltd. (propylene-ethylene random copolymer, MFR=25 g/10 min).

Production of Tubular Molded Article

Examples 1 to 13 and Comparative Examples 1 to 12

<Single-Layered Tubular Molded Article>

The hydrogenated block copolymer and the polypropylene resin were dry-blend in a blending ratio shown in Table 2 below. The blend was extruded by using a single-screw extruder (40 mmφ) and a tube die having an outer diameter of 13 mm and an inner diameter of 11 mm at 190° C. and an extrusion rate of 10 m/min to produce a tubular molded article having an outer diameter of 7.0 mm and an inner diameter of 5.0 mm.

The outer diameter and the inner diameter were adjusted by changing the number of screw revolutions.

TABLE 2

| | | | Example | | | | | | | Comparative Example | | | | | | | | | | | | | Example | | | | | |
|---|---|---|---|---|---|---|---|---|---|---|---|---|---|---|---|---|---|---|---|---|---|---|---|---|---|---|---|---|
| | | | 1 | 2 | 3 | 4 | 5 | 6 | 7 | 1 | 2 | 3 | 4 | 5 | 6 | 7 | 8 | 9 | 10 | 11 | 12 | 8 | 9 | 10 | 11 | 12 | 13 |
| Material composition (parts by mass) | Hydrogenated block copolymer (a) | Type | a-1 | a-2 | a-3 | a-4 | a-5 | a-6 | a-1 | a-7 | a-8 | a-9 | a-10 | a-11 | a-12 | a-13 | a-14 | a-15 | a-1 | a-1 | b3 | a-16 | a-17 | a-18 | a-19 | a-20 | a-21 |
| | | Blending ratio (parts by mass) | 60 | 60 | 60 | 60 | 60 | 60 | 55 | 60 | 60 | 60 | 60 | 60 | 60 | 60 | 60 | 60 | 30 | 98 | 60 | 70 | 45 | 55 | 60 | 85 | 60 |
| | Polypropylene resin (c1) | Blending ratio (parts by mass) | 40 | 40 | 40 | 40 | 40 | 40 | | 40 | 40 | 40 | 40 | 40 | 40 | 40 | 40 | 40 | 70 | 2 | 40 | 30 | | 45 | 40 | 15 | 40 |
| | Polypropylene resin (c2) | Blending ratio (parts by mass) | | | | | | | 45 | | | | | | | | | | | | | | 55 | | | | |
| Tube diameter | | Outer diameter (mm) | 7 | 7 | 7 | 7 | 7 | 7 | 7 | 7 | Not formable | 7 | 7 | 7 | 7 | 7 | 7 | 7 | 7 | Not formable | 7 | 7 | 7 | 7 | 7 | 7 | 7 |
| | | Inner diameter (mm) | 5 | 5 | 5 | 5 | 5 | 5 | 5 | 5 | | 5 | 5 | 5 | 5 | 5 | 5 | 5 | 5 | | 5 | 5 | 5 | 5 | 5 | 5 | 5 |
| Intensity ratio (I14/I15) | | | 1.05 | 0.98 | 1.22 | 1.20 | 0.80 | 1.38 | 1.05 | 1.67 | | 2.03 | 1.47 | 2.21 | 0.97 | 1.23 | 1.31 | 1.32 | 1.03 | | 1.93 | 1.05 | 1.12 | 1.08 | 1.09 | 1.12 | 0.95 |
| Performance evaluation | Tubular molded article | Transparency | 5 | 5 | 4 | 3 | 5 | 2 | 5 | 1 | | 1 | 2 | 3 | 5 | 3 | 2 | 2 | 3 | | 2 | 4 | 3 | 4 | 5 | 4 | 4 |
| | | Flexibility | 5 | 5 | 4 | 4 | 5 | 3 | 5 | 1 | | 1 | 2 | 2 | 5 | 4 | 1 | 1 | 3 | | 2 | 4 | 3 | 4 | 5 | 4 | 4 |
| | | Kink resistance | 5 | 5 | 3 | 3 | 4 | 3 | 5 | 1 | | 1 | 1 | 2 | 1 | 2 | 2 | 2 | 1 | | 2 | 3 | 3 | 4 | 5 | 4 | 4 |
| | | Low stickiness | 4 | 3 | 5 | 5 | 2 | 5 | 5 | 5 | | 5 | 5 | 5 | 5 | 1 | 5 | 5 | 5 | | 5 | 4 | 4 | 4 | 3 | 2 | 2 |
| | | Strain recoverability | 5 | 4 | 5 | 4 | 3 | 4 | 4 | 2 | | 1 | 1 | 3 | 1 | 1 | 2 | 3 | 5 | | 3 | 4 | 4 | 4 | 4 | 3 | 2 |
| | | Performance balance | 24 | 22 | 21 | 19 | 19 | 17 | 24 | 10 | | 9 | 11 | 15 | 13 | 11 | 12 | 13 | 17 | | 14 | 19 | 17 | 20 | 22 | 17 | 16 |
| CFC area % | | −20° C.≥ more than | 6.2 | 5.6 | 5.0 | 6.4 | 5.6 | 4.2 | 5.2 | 7.6 | | 5.6 | 5.2 | 60.0 | 7.2 | 4.4 | 5.2 | 2.4 | 3.5 | 6.9 | 59.0 | 7.6 | 6.1 | 2.0 | 7.2 | 4.0 | 2.8 |
| | | −20° C. and less than 60° C. | 55.8 | 57.6 | 57.0 | 56.4 | 55.2 | 58.2 | 51.2 | 55.2 | | 57.6 | 56.4 | 1.2 | 55.2 | 57.6 | 56.4 | 58.8 | 27.9 | 91.14 | 0.0 | 63.0 | 40.1 | 53.9 | 54.0 | 81.6 | 57.6 |
| | | 60° C. or more and 150° C. or less | 38.0 | 36.8 | 38.0 | 37.2 | 39.2 | 37.6 | 43.7 | 37.2 | | 36.8 | 38.4 | 38.8 | 37.6 | 38.0 | 38.4 | 38.8 | 68.6 | 1.96 | 41.0 | 29.4 | 53.9 | 44.1 | 38.8 | 14.4 | 39.6 |

From the results in Table 2, it has been found that the tubular molded articles obtained in Examples 1 to 13 have a satisfactory balance among transparency, flexibility, kink resistance, sticking resistance, and strain recoverability.

In contrast, it has been found that the tubular molded articles obtained in Comparative Examples 1 to 12 have an inferior balance among transparency, flexibility, kink resistance, sticking resistance, and strain recoverability.

Examples 14 to 18 and Comparative Examples 13 to 20

(Three-Layered Tubular Molded Article)

The hydrogenated block copolymer and the polypropylene resin were dry-blended in a blending ratio and a layer configuration shown in Table 3 below. The blend was extruded by using a single-screw extruder (20 mmφ) for the outer layer, a single-screw extruder (25 mmφ) for the intermediate layer, a single-screw extruder (30 mmφ) for the inner layer, and a tube die for three layers having an outer diameter of 15 mm and an inner diameter of 12 mm at 190° C. and an extrusion rate of 10 m/min to produce a tubular molded article having an outer diameter of 7.0 mm and an inner diameter of 5.0 mm.

The outer diameter, the inner diameter, and the thickness of each layer were adjusted by changing the number of screw revolutions.

TABLE 3

|  |  |  |  | Example |  |  |  |  | Comparative Example |  |  |  |  |  |  |  |
|---|---|---|---|---|---|---|---|---|---|---|---|---|---|---|---|---|
|  |  |  |  | 14 | 15 | 16 | 17 | 18 | 13 | 14 | 15 | 16 | 17 | 18 | 19 | 20 |
| Material composition (parts by mass) | Outer layer | Hydrogenated block copolymer (a) | Type | a-1 | a-1 | a-1 | a-2 | a-1 | a-7 | a-9 | a-10 | a-11 | a-12 | a-12 | a-13 | a-14 |
|  |  |  | Blending ratio (parts by mass in outer layer) | 40 | 35 | 30 | 35 | 30 | 40 | 40 | 40 | 40 | 40 | 35 | 40 | 40 |
|  |  | Hydrogenated block copolymer (b1) | Blending ratio (parts by mass in outer layer) |  | 5 |  | 5 |  |  |  |  |  |  | 5 |  |  |
|  |  | Polypropylene resin (c1) | Blending ratio (parts by mass in outer layer) | 60 | 60 | 70 | 60 | 70 | 60 | 60 | 60 | 60 | 60 | 60 | 60 | 60 |
|  |  | Thickness (mm) |  | 0.05 | 0.05 | 0.05 | 0.05 | 0.05 | 0.05 | 0.05 | 0.05 | 0.05 | 0.05 | 0.05 | 0.05 | 0.05 |
|  | Intermediate layer | Hydrogenated block copolymer (a) | Type | a-1 | a-1 | a-1 | a-2 | a-1 | a-7 | a-9 | a-10 | a-11 | a-12 | a-12 | a-13 | a-14 |
|  |  |  | Blending ratio (parts by mass in intermediate layer) | 100 | 100 | 90 | 100 | 70 | 100 | 100 | 100 | 100 | 100 | 100 | 100 | 100 |
|  |  | Polypropylene resin (c1) | Blending ratio (parts by mass in intermediate layer) |  |  | 10 |  | 30 |  |  |  |  |  |  |  |  |
|  |  | Thickness (mm) |  | 0.05 | 0.05 | 0.05 | 0.05 | 0.85 | 0.05 | 0.05 | 0.05 | 0.05 | 0.05 | 0.05 | 0.05 | 0.05 |
|  | Inner layer | Hydrogenated block copolymer (a) | Type | a-1 | a-1 | a-1 | a-2 | a-1 | a-7 | a-9 | a-10 | a-11 | a-12 | a-12 | a-13 | a-14 |
|  |  |  | Blending ratio (parts by mass in inner layer) | 60 | 60 | 65 | 55 | 40 | 60 | 60 | 60 | 60 | 60 | 60 | 60 | 60 |
|  |  | Hydrogenated block copolymer (b2) | Blending ratio (parts by mass in inner layer) |  |  | 5 |  |  |  |  |  |  |  |  |  |  |
|  |  | Polypropylene resin (c1) | Blending ratio (parts by mass in inner layer) | 40 | 40 | 30 | 45 | 60 | 40 | 40 | 40 | 40 | 40 | 40 | 40 | 40 |
|  |  | Thickness (mm) |  | 0.9 | 0.9 | 0.9 | 0.9 | 0.1 | 0.9 | 0.9 | 0.9 | 0.9 | 0.9 | 0.9 | 0.9 | 0.9 |
|  |  | Outer diameter (mm) |  | 7 | 7 | 7 | 7 | 7 | 7 | 7 | 7 | 7 | 7 | 7 | 7 | 7 |
|  |  | Intensity ratio (I14/I15) |  | 1.11 | 1.22 | 1.27 | 1.18 | 1.14 | 1.72 | 2.15 | 1.55 | 2.32 | 1.13 | 1.29 | 1.32 | 1.41 |
| Performance evaluation | Tubular molded article | Transparency |  | 5 | 4 | 5 | 4 | 4 | 1 | 1 | 2 | 2 | 4 | 3 | 2 | 1 |
|  |  | Flexibility |  | 4 | 4 | 4 | 4 | 5 | 1 | 1 | 2 | 2 | 4 | 3 | 3 | 1 |
|  |  | Kink resistance |  | 5 | 5 | 4 | 5 | 5 | 1 | 1 | 1 | 2 | 1 | 1 | 2 | 2 |
|  |  | Low stickiness |  | 5 | 5 | 5 | 5 | 5 | 5 | 5 | 5 | 5 | 3 | 4 | 3 | 5 |
|  |  | Strain recoverability |  | 5 | 4 | 4 | 4 | 5 | 2 | 1 | 2 | 4 | 2 | 2 | 2 | 2 |
|  |  | Performance balance |  | 24 | 22 | 22 | 22 | 24 | 10 | 9 | 12 | 15 | 14 | 13 | 12 | 11 |
|  | CFC area % | −20° C.≥ |  | 5.3 | 5.0 | 9.6 | 6.9 | 4.3 | 4.6 | 6.8 | 61.1 | 6.1 | 4.8 | 6.6 | 6.8 | 7.0 |
|  |  | more than −20° C. and less than 60° C. |  | 59.2 | 58.3 | 60.0 | 51.8 | 61.8 | 59.2 | 57.3 | 1.9 | 57.2 | 57.3 | 58.3 | 57.3 | 56.7 |
|  |  | 60° C. or more and 150° C. or less |  | 35.5 | 36.7 | 30.4 | 41.3 | 34.0 | 36.3 | 35.9 | 37.1 | 36.7 | 37.8 | 35.1 | 35.9 | 36.3 |

From the results in Table 3, it has been found that the tubular molded articles obtained in Examples 14 to 18 have a satisfactory balance among transparency, flexibility, kink resistance, sticking resistance, and strain recoverability.

In contrast, it has been found that the tubular molded articles obtained in Comparative Examples 13 to 20 have an inferior balance among transparency, flexibility, kink resistance, sticking resistance, and strain recoverability.

This application is based on Japanese Patent Application No. 2015-177933 filed to the Japan Patent Office on Sep. 9, 2015, the contents of which is incorporated herein by reference.

INDUSTRIAL APPLICABILITY

The tube of the present embodiment has industrial applicability for various tubular molded articles such as automobile parts, civil engineering and construction applications, home electronics parts, food processing parts, medical parts, sporting goods, commodities, and stationery.

The invention claimed is:

1. A tube comprising a hydrogenated block copolymer (a), wherein
   the hydrogenated block copolymer (a) comprises, in a molecule, a polymer block mainly comprising a conjugated diene compound (C), a polymer block mainly comprising a conjugated diene compound (B), and a polymer block mainly comprising a vinyl aromatic compound (S),
   a content of the polymer block mainly comprising the conjugated diene compound (C) is 1 to 30% by mass, a content of the polymer block mainly comprising the conjugated diene compound (B) is 69 to 98% by mass, and a content of the polymer block mainly comprising the vinyl aromatic compound (S) is 1 to 20% by mass in the hydrogenated block copolymer (a),
   the polymer block mainly comprising a conjugated diene compound (C) has a vinyl bond content before hydrogenation of 1 to 25 mol %, the polymer block mainly comprising the conjugated diene compound (B) has a vinyl bond content before hydrogenation of 60 to 100 mol %, and the hydrogenated block copolymer (a) has a ratio of hydrogenation of 80 mol % or more, and
   a content of the polymer block (C) is 3 to 15% by mass, a content of the polymer block (B) is 72 to 94% by mass, and a content of the polymer block (S) is 3 to 13% by mass in the hydrogenated block copolymer (a), and the hydrogenated block copolymer (a) has a ratio of hydrogenation of 90 mol % or more.

2. The tube according to claim 1, wherein
   a tan $\delta$ peak obtained by dynamic viscoelasticity measurement (1 Hz) of the hydrogenated block copolymer (a) is in a range of more than $-45°$ C. and $10°$ C. or less,
   a value of the tan $\delta$ peak is 1.0 or more, and
   a half width of the tan $\delta$ peak is $20°$ C. or less.

3. The tube according to claim 1, comprising the hydrogenated block copolymer (a) and a polypropylene resin.

4. The tube according to claim 1, wherein an intensity ratio of a diffraction peak intensity at a scattering angle ($2\theta$) of $15°$ (I(15)) to a diffraction peak intensity at a scattering angle ($2\theta$) of $14°$ (I(14)), (I(14)/I(15)), in wide angle X-ray diffraction measurement is 0.1 or more and less than 1.4.

5. The tube according to claim 1, wherein
   the hydrogenated block copolymer (a) has a weight average molecular weight (Mw) of 100,000 to 300,000, and
   a ratio of a weight average molecular weight (Mw) to a number average molecule weight (Mn) of the hydrogenated block copolymer (a), (Mw)/(Mn), is 1.01 to 1.30.

6. The tube according to claim 1, wherein an integrated amount of elution at $-20°$ C. or less measured by cross-fractionation chromatography (CFC) is 0.1% or more and less than 40% based on a total volume, an integrated amount of elution in a range of more than $-20°$ C. and less than $60°$ C. is 40% or more and less than 95% based on a total volume, and an integrated amount of elution in a range of $60°$ C. or more and $150°$ C. or less is 5% or more and less than 60% based on a total volume.

7. The tube according to claim 1, wherein a molecular weight distribution (Mw/Mn) of an eluted component in a range of $10°$ C. or more and less than $60°$ C. measured by cross-fractionation chromatography (CFC) is 1.05 or more and 1.50 or less.

8. The tube according to claim 1, comprising at least an outer layer and an inner layer, wherein
   the outer layer comprises the polypropylene resin, and
   the inner layer comprises the hydrogenated block copolymer (a).

9. The tube according to claim 8, wherein
   the outer layer has a thickness of 5 to 1,000 µm, and
   the inner layer has a thickness of 10 to 3,000 µm.

10. The tube according to claim 8, wherein
    the outer layer comprises the hydrogenated block copolymer (a) and/or hydrogenated block copolymer (b1) (provided that the hydrogenated block copolymer (b1) comprises no polymer block mainly comprising a conjugated diene compound having a vinyl bond content before hydrogenation of 1 to 25 mol %),
    the hydrogenated block copolymer (b1) comprises a polymer block mainly comprising a conjugated diene compound (B1) and a polymer block mainly comprising a vinyl aromatic compound (S1),
    a content of the polymer block mainly comprising the conjugated diene compound (B1) is 75 to 92% by mass and a content of the polymer block mainly comprising the vinyl aromatic compound (S1) is 8 to 25% by mass in the hydrogenated block copolymer (b1),
    a vinyl bond content before hydrogenation of the polymer block mainly comprising a conjugated diene compound (B1) is 40 to 100 mol %,
    the hydrogenated block copolymer (b1) has a ratio of hydrogenation of 80 mol % or more,
    a content of the polypropylene resin in the outer layer is 60 to 100% by mass, and
    a content of the hydrogenated block copolymer (a) and/or hydrogenated block copolymer (b1) in the outer layer is 0 to 40% by mass.

11. The tube according to claim 8, wherein
    the inner layer comprises a polypropylene resin, and
    a content of the hydrogenated block copolymer (a) in the inner layer is 40 to 95% by mass.

12. The tube according to claim 8, wherein
    the inner layer comprises a hydrogenated block copolymer (b2) (provided that the hydrogenated block copolymer (b2) comprises no polymer block mainly comprising a conjugated diene compound having a vinyl bond content before hydrogenation of 1 to 25 mol %),
    the hydrogenated block copolymer (b2) comprises a polymer block mainly comprising a conjugated diene compound (B2) and a polymer block mainly comprising a vinyl aromatic compound (S2),
    a content of the polymer block mainly comprising the conjugated diene compound (B2) is 75 to 92% by mass and a content of the polymer block mainly comprising the vinyl aromatic compound (S2) is 8 to 25% by mass in the hydrogenated block copolymer (b2),
    a vinyl bond content before hydrogenation of the polymer block mainly comprising the conjugated diene compound (B2) is 60 to 100 mol %,
    the hydrogenated block copolymer (b2) has a ratio of hydrogenation of 80 mol % or more,
    a content of the polypropylene resin in the inner layer is 5 to 60% by mass, and
    a total content of the hydrogenated block copolymer (a) and the hydrogenated block copolymer (b2) in the inner layer is 40 to 95% by mass.

13. The tube according to claim 8, comprising an intermediate layer between the outer layer and the inner layer, wherein
the intermediate layer comprises the hydrogenated block copolymer (a).

14. A tube comprising a hydrogenated block copolymer (a), wherein
the hydrogenated block copolymer (a) comprises, in a molecule, a polymer block mainly comprising a conjugated diene compound (C), a polymer block mainly comprising a conjugated diene compound (B), and a polymer block mainly comprising a vinyl aromatic compound (S),
a content of the polymer block mainly comprising the conjugated diene compound (C) is 1 to 30% by mass, a content of the polymer block mainly comprising the conjugated diene compound (B) is 69 to 98% by mass, and a content of the polymer block mainly comprising the vinyl aromatic compound (S) is 1 to 20% by mass in the hydrogenated block copolymer (a),
the polymer block mainly comprising a conjugated diene compound (C) has a vinyl bond content before hydrogenation of 1 to 25 mol %, the polymer block mainly comprising the conjugated diene compound (B) has a vinyl bond content before hydrogenation of 60 to 100 mol %, and the hydrogenated block copolymer (a) has a ratio of hydrogenation of 80 mol % or more,
the hydrogenated block copolymer (a) comprises two or more of the polymer blocks mainly comprising a conjugated diene compound (B) in a molecule, and
a content of a polymer block (B-1) present at a terminal of the hydrogenated block copolymer (a) of the polymer blocks mainly comprising the conjugated diene compound (B) is 1 to 10% by mass in the hydrogenated block copolymer (a).

15. The tube according to claim 14, wherein
a tan δ peak obtained by dynamic viscoelasticity measurement (1 Hz) of the hydrogenated block copolymer (a) is in a range of more than −45° C. and 10° C. or less,
a value of the tan δ peak is 1.0 or more, and
a half width of the tan δ peak is 20° C. or less.

16. The tube according to claim 14, comprising the hydrogenated block copolymer (a) and a polypropylene resin.

17. The tube according to claim 14, wherein an intensity ratio of a diffraction peak intensity at a scattering angle (2θ) of 15° (I(15)) to a diffraction peak intensity at a scattering angle (2θ) of 14° (I(14)), (I(14)/I(15)), in wide angle X-ray diffraction measurement is 0.1 or more and less than 1.4.

18. The tube according to claim 14, wherein
the hydrogenated block copolymer (a) has a weight average molecular weight (Mw) of 100,000 to 300,000, and
a ratio of a weight average molecular weight (Mw) to a number average molecule weight (Mn) of the hydrogenated block copolymer (a), (Mw)/(Mn), is 1.01 to 1.30.

19. The tube according to claim 14, wherein an integrated amount of elution at −20° C. or less measured by cross-fractionation chromatography (CFC) is 0.1% or more and less than 40% based on a total volume, an integrated amount of elution in a range of more than −20° C. and less than 60° C. is 40% or more and less than 95% based on a total volume, and an integrated amount of elution in a range of 60° C. or more and 150° C. or less is 5% or more and less than 60% based on a total volume.

20. The tube according to claim 14, wherein a molecular weight distribution (Mw/Mn) of an eluted component in a range of 10° C. or more and less than 60° C. measured by cross-fractionation chromatography (CFC) is 1.05 or more and 1.50 or less.

21. The tube according to claim 14, comprising at least an outer layer and an inner layer, wherein
the outer layer comprises the polypropylene resin, and
the inner layer comprises the hydrogenated block copolymer (a).

22. The tube according to claim 21, wherein
the outer layer has a thickness of 5 to 1,000 μm, and
the inner layer has a thickness of 10 to 3,000 μm.

23. The tube according to claim 21, wherein
the outer layer comprises the hydrogenated block copolymer (a) and/or hydrogenated block copolymer (b1) (provided that the hydrogenated block copolymer (b1) comprises no polymer block mainly comprising a conjugated diene compound having a vinyl bond content before hydrogenation of 1 to 25 mol %),
the hydrogenated block copolymer (b1) comprises a polymer block mainly comprising a conjugated diene compound (B1) and a polymer block mainly comprising a vinyl aromatic compound (S1),
a content of the polymer block mainly comprising the conjugated diene compound (B1) is 75 to 92% by mass and a content of the polymer block mainly comprising the vinyl aromatic compound (S1) is 8 to 25% by mass in the hydrogenated block copolymer (b1),
a vinyl bond content before hydrogenation of the polymer block mainly comprising a conjugated diene compound (B1) is 40 to 100 mol %,
the hydrogenated block copolymer (b1) has a ratio of hydrogenation of 80 mol % or more,
a content of the polypropylene resin in the outer layer is 60 to 100% by mass, and
a content of the hydrogenated block copolymer (a) and/or hydrogenated block copolymer (b1) in the outer layer is 0 to 40% by mass.

24. The tube according to claim 21, wherein
the inner layer comprises a polypropylene resin, and
a content of the hydrogenated block copolymer (a) in the inner layer is 40 to 95% by mass.

25. The tube according to claim 21, wherein
the inner layer comprises a hydrogenated block copolymer (b2) (provided that the hydrogenated block copolymer (b2) comprises no polymer block mainly comprising a conjugated diene compound having a vinyl bond content before hydrogenation of 1 to 25 mol %),
the hydrogenated block copolymer (b2) comprises a polymer block mainly comprising a conjugated diene compound (B2) and a polymer block mainly comprising a vinyl aromatic compound (S2),
a content of the polymer block mainly comprising the conjugated diene compound (B2) is 75 to 92% by mass and a content of the polymer block mainly comprising the vinyl aromatic compound (S2) is 8 to 25% by mass in the hydrogenated block copolymer (b2),
a vinyl bond content before hydrogenation of the polymer block mainly comprising the conjugated diene compound (B2) is 60 to 100 mol %,
the hydrogenated block copolymer (b2) has a ratio of hydrogenation of 80 mol % or more,
a content of the polypropylene resin in the inner layer is 5 to 60% by mass, and
a total content of the hydrogenated block copolymer (a) and the hydrogenated block copolymer (b2) in the inner layer is 40 to 95% by mass.

26. The tube according to claim 21, comprising an intermediate layer between the outer layer and the inner layer, wherein the intermediate layer comprises the hydrogenated block copolymer (a).

* * * * *